United States Patent [19]
Quirin

[11] Patent Number: 5,111,636
[45] Date of Patent: May 12, 1992

[54] HAYMAKING MACHINE HAVING MULTIPLE ROTORS

[75] Inventor: Michel Quirin, Wasselonne, France
[73] Assignee: Kuhn S.A., Saverne, France
[21] Appl. No.: 691,401
[22] Filed: Apr. 25, 1991

[30] Foreign Application Priority Data
Apr. 27, 1990 [FR] France .................. 90 05610

[51] Int. Cl.⁵ .................. A01D 78/10; A01D 80/00
[52] U.S. Cl. .................. 56/367; 56/370; 56/DIG. 10
[58] Field of Search .......... 56/370, 365, 366, 367, 56/396, 376, 377, DIG. 10, DIG. 21, 385

[56] References Cited
U.S. PATENT DOCUMENTS

| | | | |
|---|---|---|---|
| 4,366,666 | 1/1983 | van der Lely | 56/370 |
| 4,453,376 | 6/1984 | Wattron et al. | 56/370 |
| 4,519,194 | 5/1985 | Aron et al. | 56/370 |
| 4,688,377 | 8/1987 | Winkel et al. | 56/370 X |
| 4,723,404 | 2/1988 | Aron | 56/370 |
| 4,996,833 | 3/1991 | Allowerden | 56/367 |

Primary Examiner—Stephen J. Novosad
Attorney, Agent, or Firm—Oblon, Spivak, McClelland, Maier & Neustadt

[57] ABSTRACT

This invention relates to a haymaking machine which includes a frame having a central section and three lateral sections which are connected to one another and which carry rotors rotatably driven during working operation. The lateral sections can be folded for transport by hydraulic cylinders. On each side of central section there are located the three lateral sections, each of which includes a pipe and a housing equipped with a rotor. A hydraulic cylinder extends directly from the central section to each third lateral section and in the transporting position, the first and second lateral sections are directed upward and the third lateral sections are directed downward.

37 Claims, 23 Drawing Sheets

FIG. 4

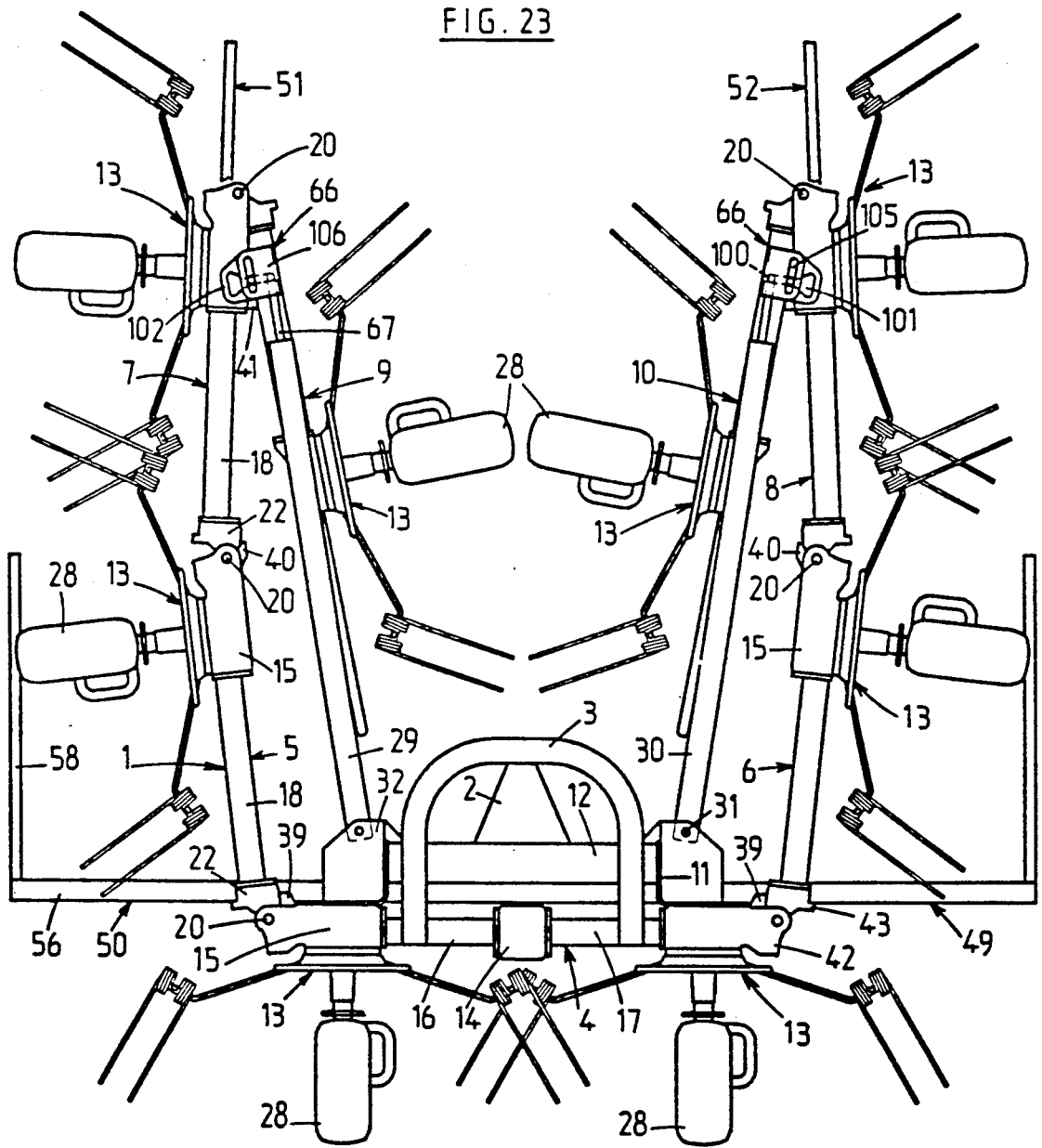

HAYMAKING MACHINE HAVING MULTIPLE ROTORS

BACKGROUND OF THE INVENTION

1. Field of the Invention

This invention relates to a haymaking machine comprising a frame able to be coupled to a tractor, the frame including a central section and several lateral sections which are connected to one another by pins oriented in the direction of movement and which carry rotors rotatably driven during working operation by transmission elements which are housed in the sections of the frame, the lateral sections being transposed by hydraulic cylinders into a working position in which they are approximately aligned and a transporting position in which they are folded around their joint pins.

2. Discussion of the Background

Machines of this type are known in patents FR - 2 582 186 and FR - 2 618 045. The first of these patents relates to a machine having four rotors while the second relates to a machine with six rotors. These machines are perfectly suitable for small and medium farms. Their working widths are not large enough, however, for large farms or contractors, the latter requiring more high-powered machines.

German Patent - 3 827 047 relates to a machine comprising eight rotors in total. On this machine, the last two rotors of each end of the frame are located on the same section and are rigidly attached to one another. These rotors therefore cannot correctly follow the uneven contour of the ground. In addition, in the transporting position, all the lateral sections are directed upward. The height of the machine is then extremely large, which is troublesome for passing, for example, under an opening of a barn, under a bridge or even under trees. Moreover, in this position, the machine requires a very tall shelter for covering it during the period of the year when it is not used and its stability is not absolutely reliable.

SUMMARY OF THE INVENTION

This invention has as its object to provide a machine with a large working width, which is of simple design, perfectly able to adapt to the uneven contour of the ground during working operation and whose bulkiness can be considerably reduced for transport.

For this purpose, an important characteristic of the invention consists of the fact that on each side of the central section of the frame, three lateral sections are placed which are connected to one another by pins oriented in the direction of movement and each of which consists of a pipe and a housing equipped with a rotor. A hydraulic cylinder extends directly from the central section to each third lateral section and in the transporting position, the first and second lateral sections are directed upward and the third lateral sections are directed downward starting from their respective joint pins.

This machine thus can comprise eight rotors, which makes it possible for it to have a very large working width. The composition of the lateral sections assures them good stability during working operation. They can also individually follow the uneven contour of the ground. On the other hand, the two hydraulic cylinders make it possible to fold all the lateral sections in a transport position in which the height of the machine is small. It can thus be moved without difficulty and its stability when it is laid down is very good. This position is also suitable for putting the machine under a shelter during the winter. The two hydraulic cylinders also make it possible to deploy the lateral sections totally to return to the working position. These maneuvers are very simple to perform from the tractor.

Another characteristic of the invention consists of the fact that in the horizontal position, each hydraulic cylinder is more distant from the ground than the various joint pins between the sections. As a result, simple traction of the cylinders is sufficient to make the lateral sections pivot upward around said joint pins.

Another characteristic consists of the fact that each hydraulic cylinder is located in front of the lateral sections of the frame. The third lateral sections thus can be folded by up to approximately 180° around their joint pins without their colliding with the cylinders.

Another characteristic consists in that, at its end which is connected to the third lateral section, each hydraulic cylinder comprises a journal which is housed in oblong orifices provided in a yoke integral with said section. During working operation, the position of the lateral sections thus can vary relative to the cylinders so that they can follow the uneven contour of the ground.

Another characteristic of the invention consists in the fact that, at the level of the ends of the hydraulic cylinders which are connected to the third lateral sections, means are provided for assuring a large lever arm in the cylinders when they pull on or push the third lateral sections to move them into a working position or else into a transport position.

These means can consist of orifices of various oblong shapes which are provided in yokes integral with the third lateral sections, journals integral with the hydraulic cylinders and which move into said orifices and guiding devices of said journals.

According to another characteristic of the invention, the frame of the machine comprises telescopic stopping devices which extend between the central section and the second lateral sections. When the machine is lifted from the ground with the deployed lateral sections, these stopping devices virtually carry said lateral sections. They thus avoid too strong a stress being applied to the joints between the second and the first lateral sections as well as those joints between the latter and the central section. A lock which is maneuverable from a distance can be advantageously combined with each of these devices. Each lock serves to lock the corresponding device when the lateral sections are in the transporting position. These sections are thus immobilized in a positive manner during movements.

Another characteristic of the invention consists of the fact that the machine comprises tie rods connecting the joint pins between the first and the second lateral sections to stationary crossbeams integral with the frame. These tie rods can be connected to said crossbeams at locations in the extension of the joint pins between the first lateral sections and the central section. These stationary crossbeams and the tie rods contribute to keeping the various sections of the frame aligned during working operation. They also relieve the joints between the sections of the frame when the rotors encounter obstacles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4 and 5 represent rear views of the same machine, at two different stages, during the transposition from the working position into the transporting position or conversely.

FIG. 23 represents the machine according to FIG. 19 in the transporting position.

DESCRIPTION OF THE PREFERRED EMBODIMENTS

Figure 1:
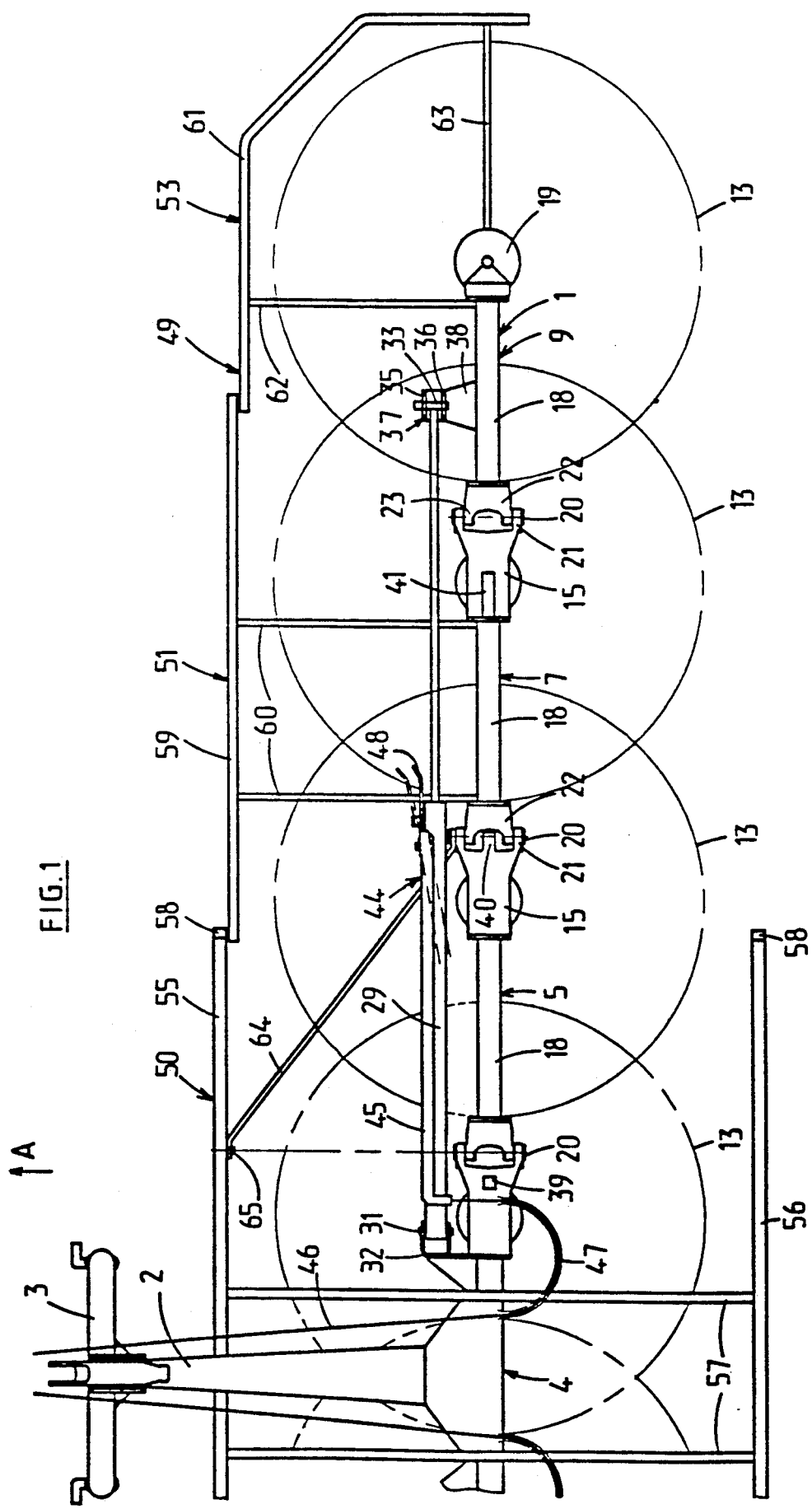
FIG. 1 represents a partial top view of a first embodiment of a machine according to the invention, in the working position.

The figures mentioned above often represent, to allow for greater clarity, only a half of the machine. The half not represented is symmetrical and therefore exhibits the same characteristics as the half represented.

As is evident from FIGS. 1 to 5, the machine of the first embodiment comprises a frame (1) able to be coupled to a driving tractor which is not shown. For this purpose, it has a beam (2) carrying a coupling device (3) at its front end. This frame (1) further consists of a central section (4) and six lateral sections (5 to 10) of which three (5, 7 and 9) are located on one side of said central section and three (6, 8 and 10) on the other side. According to their position relative to central section (4), these lateral sections (5 to 10) are referred to as first, second and third lateral sections below. Central section (4) is connected to beam (2) by brackets (11) and a crossbeam (12). This central section (4) comprises two rotors (13). It consists of a case (14), two housings (15) and two pipes (16 and 17) which connect said housings to case (14). Each lateral section (5 to 10) carries a single rotor (13) and consists of a pipe (18) and a housing (15, 19). The first and second lateral sections (5, 6 and 7, 8) are approximately identical. The third sections (9, 10) comprise end housings (19).

These various sections (4 to 10) are connected to one another by pins (20) which are approximately horizontal and are oriented in direction of advance (A). These joint pins are made in two parts aligned with one another. To connect sections (4 to 10) to one another, each housing (15) comprises two lugs (21). Each pipe (18) comprises a joining piece (22) which is also equipped with two lugs (23). The latter engage between two lugs (21) of adjacent housing (15). These various lugs (21 and 23) have bores in which joint pins (20) are housed.

Each rotor (13) consists of a hub (24) to which are attached several arms (25) carrying working forks (26) at their free ends. Each of these hubs (24) is mounted so as to be able to rotate on a stationary support shaft (27) which is approximately vertical or inclined in the direction of advance (A) of the machine. These shafts (27) are attached to housings (15, 19) of sections (4 to 10). At their lower ends, they carry small wheels (28) which roll on the ground during working operation.

These rotors (13) can be rotatably driven in rotation around their support shafts (27) by transmission shafts which are housed in sections (4 to 10). In each housing (15 and 19), these transmission shafts comprise a driving pinion which engages with a ring gear which is integral with the hub (24) of the corresponding rotor (13). On the other hand, at the level of each joint (20) between sections (4 to 10), said transmission shafts are connected to one another by coupling devices with pins which are known in the art. These coupling devices make possible movements of up to 180° between the transmission shafts.

The transmission shaft which is housed in central section (4) goes through case (14). Inside the latter, there is a driving pinion which is meshed with another pinion integral with a shaft which extends outside of case (14), on the front side of the machine. This shaft can be connected to a power takeoff shaft of the driving tractor by a cardan shaft.

Figure 2:
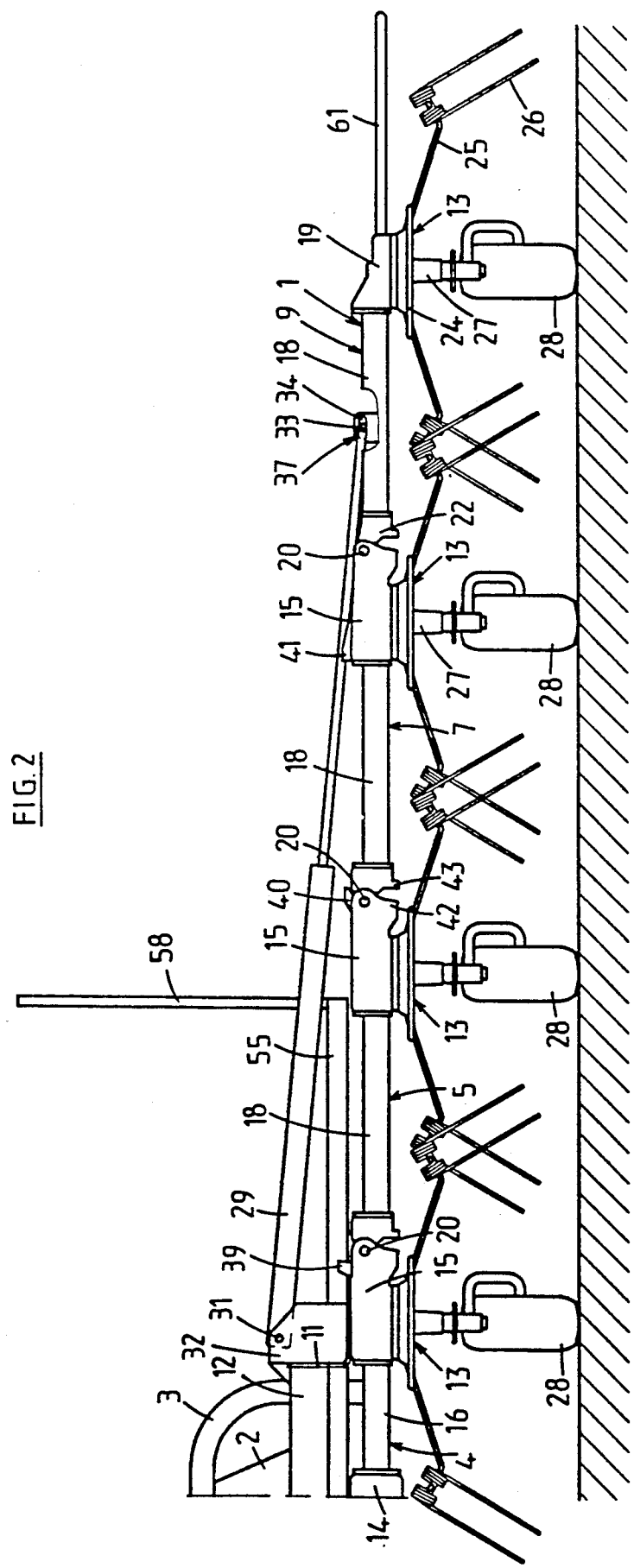
FIG. 2 represents a rear view of this machine in the working position.
Figure 3:
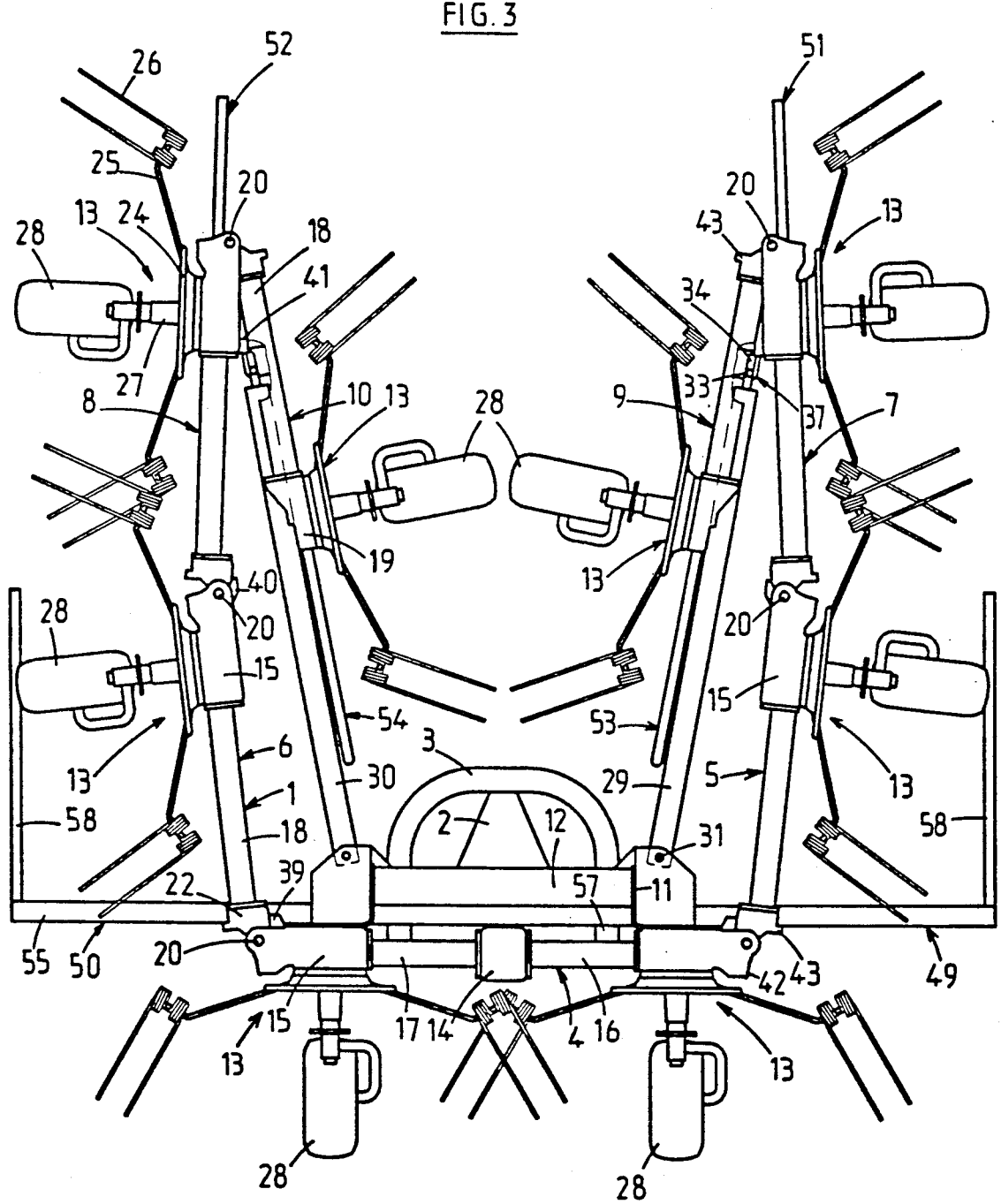
FIG. 3 represents a rear view of the same machine in the transporting position.
Figure 4:
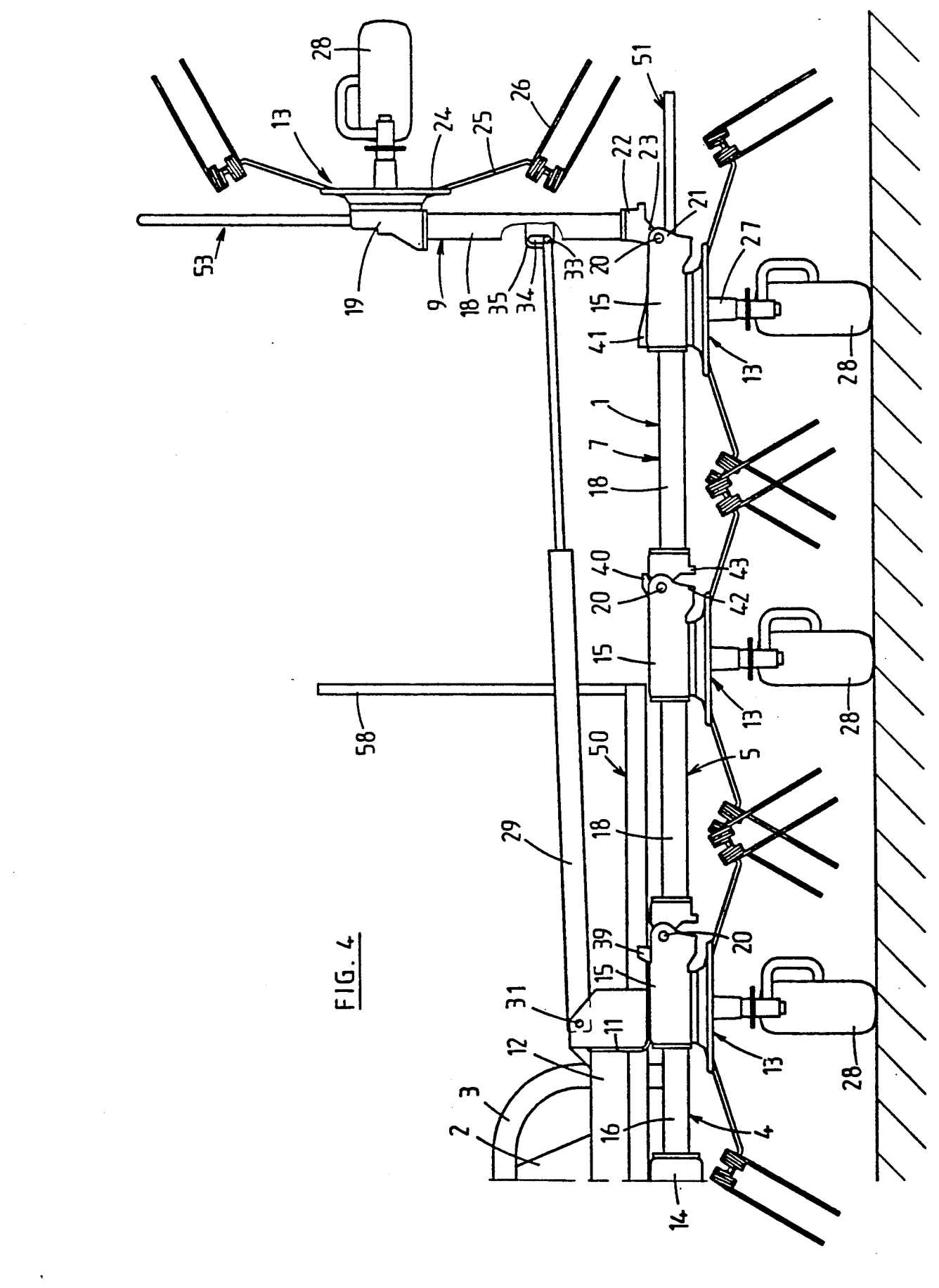

It also is evident from the figures that the machine comprises two hydraulic cylinders (29 and 30) to move lateral sections (5 to 10) into a working position in which they are approximately aligned (FIG. 1) and a transporting position in which they are folded around their joint pins (20) (FIG. 3). Each hydraulic cylinder (29, 30) extends directly from central section (4) to one of third lateral sections (9 or 10). As seen from above, these hydraulic cylinders (29, 30) are located to the front of sections (4 to 10). On the side of central section (4), each of these hydraulic cylinders (29, 30) is connected by a pin (31) in a yoke (32) which is connected to one of brackets (11). The other end of each hydraulic cylinder (29, 30) is equipped with a journal (33). The latter is engaged in oblong orifices (34) provided in two vertical plates (35, 36). The latter form a yoke (37) which is connected to a corresponding third lateral section (9 or 10) by an arm (38). The oblong shape of the orifices (34) makes it possible for lateral sections (5 to 10) to move relative to hydraulic cylinders (29, 30) to follow the uneven contour of the ground. In the embodiment represented in FIGS. 1 to 5, these orifices (34) are approximately parallel to the third lateral sections (9, 10).

It is evident from FIG. 2 that when the sections (4 to 10) of frame (1) are in a horizontal position, hydraulic cylinders (29, 30) are more distant from the ground than joint pins (20) between these sections (4 to 10). This arrangement is obtained by placing joint pins (31) and journals (33) of hydraulic cylinders (29, 30) above a horizontal plane passing through joint pins (20) between sections (4 to 10). Thus, when hydraulic cylinders (29, 30) are retracted and pull on lateral sections (5 to 10), the latter naturally have a tendency to move upward.

Housings (15) comprise stops (39, 40, 41) at their upper parts to limit the pivoting angles of lateral sections (5 to 10) when they are folded in the transporting position (FIG. 3). Lugs (21 and 23) of housings (15) and joining pieces (22) also comprise stops (42 and 43) which are directed toward the ground. The latter limit the movements of lateral sections (5 to 10) downward.

A locking device (44) making it possible to lock lateral sections (5 to 10) in the transporting position is provided on the body of each hydraulic cylinder (29, 30). Each locking device (44) comprises a lever (45) of an elongated shape. The latter is connected to the body of a corresponding cylinder (29 or 30) so as to be able to be moved to the position indicated by the dashed lines in FIG. 1. A maneuvering cable (46) is connected at an end thereof which is close to central section (4). This cable is partially guided in a sheath (47) and extends forward so as to be accessible from the tractor seat. The other end of this lever (45) is in the shape of plate (48). The latter comprises an orifice in which the end of journal (33) can engage when the corresponding hydraulic cylinder (29 or 30) is retracted in a transporting position. In addition, a spring is hooked to said lever (45) which holds the lever in the position represented by solid lines.

It is also seen in FIG. 1 that the machine is equipped with a protective device (49) which is formed of five parts (50 to 54) which are independent of one another. Part (50), which is located in the center, consists of two crossbeams (55 and 56), one of which is located in front of and the other behind rotors (13). Front crossbeam (55) is attached to beam (2) and to two side members (57). The latter are attached to central section (4) and also support rear crossbeam (56). Each of these crossbeams (55, 56), at its ends, comprises standards (58) which are directed upward. These standards (58) are located at the level of small wheels (28) of rotors (13) forming part of first lateral sections (5, 6), when they are lifted into the transporting position. They thus avoid someone colliding with forks (26) of said rotors (13) during transporting. Each intermediate part (51, 52) of protective device (49) comprises a bar (59) which extends virtually into an extension of front crossbeam (55). Bars (59) are connected to second lateral sections (7 and 8) by side members (60). Each outside part (53, 54) comprises a bar (61) which extends virtually into an extension of adjacent bar (59) and partially surrounds rotor (13) of corresponding third lateral section (9, 10). These bars (61) are connected to sections (9, 10) with side members (62 and 63).

Tie rods (64) are further provided to connect lateral sections (5 to 10) to front crossbeam (55). On the side of the lateral sections, they are connected to joint pins (20) between first and second sections (5, 6 and 7, 8). On the side of crossbeam (55), they are connected to pivots (65) which extend into the extension of joint pins (20) between central section (4) and first lateral sections (5, 6).

According to an alternate embodiment which is not shown, these tie rods (64) consist of flexible elements such as cables or chains which extend from front crossbeam (55) to housings (15) of first lateral sections (5, 6).

In the embodiment of FIGS. 6 to 9, frame (1) and rotors (13) of the machine are comparable to those of the preceding example. As a result, they will not be described in greater detail. Hydraulic cylinders (29 and 30) used for lifting lateral sections (5 to 10) also extend from central section (4) to third lateral sections (9, 10). They comprise means (66) for providing a large lever arm to move third lateral sections (9 and 10). Rod (67) of each of these hydraulic cylinders (29, 30) is equipped with a journal (68) which is guided in orifices (69) with three branches (70, 71, 72) in the shape of a Y. These orifices are provided in two parallel plates (73) which are connected to third lateral sections (9, 10) and form yokes (74). Branch (70) of each orifice (69) is approximately parallel to pipe (18) of the corresponding third lateral section (9, 10). In a working position, two other branches (71 and 72) of each orifice (69) are directed toward the center of the machine, one obliquely upward and the other obliquely downward. One of plates (73) comprises, in addition, a mobile guide (75). The latter can block the opening of one or the other of two oblique branches (71, 72) to direct the journal (68) into the suitable branch (71 or 72) so as to increase the lever arm when the corresponding hydraulic cylinder (29 or 30) acts on the third lateral section (9 or 10). Guide (75) has a triangular shape. It is connected to a pivot (76) and can rotate around the latter under the effect of its own weight. Each plate (73) which carries a guide (75) comprises, in addition, two stops (77, 78). The latter stop said guide in the positions in which it prevents access to one or the other of branches (71, 72).

The machine according to the embodiment of FIGS. 10 to 13 also comprises a frame (1) and rotors (13) comparable to those of the first embodiment already described. In this case, the hydraulic cylinders (29, 30) comprise means (66) consisting of journals (79) which are guided in the orifices (80) of an elongated shape. In the working position, orifices (80) are directed obliquely upward in the direction of the center of the machine. They thus form angles of about 45° with the horizontal line. They are provided in two triangular plates (81) constituting a yoke (82). The latter are connected to third lateral sections (9, 10).

Each second lateral section (7, 8) comprises a guiding device (83) exhibiting two parallel plates (84) connected by an arm (85) to housing (15) of said section (7, 8). These two plates (84) are approximately rectangular. They are spaced so that rod (67) of cylinder (29, 30) can pass between them. The total thickness of guiding device (83), however, is less than the spacing between two plates (81) which form yoke (82). It can thus be housed between said plates (81) when corresponding third lateral section (9, 10) is folded around its joint pin (20). The height of these plates (84) of each guiding device (83) is such that in the folded position of the corresponding third lateral section (9, 10), orifices (80) of plates (81) of yoke (82) project slightly upward beyond said plates (84) (see FIG. 13).

Figure 10:
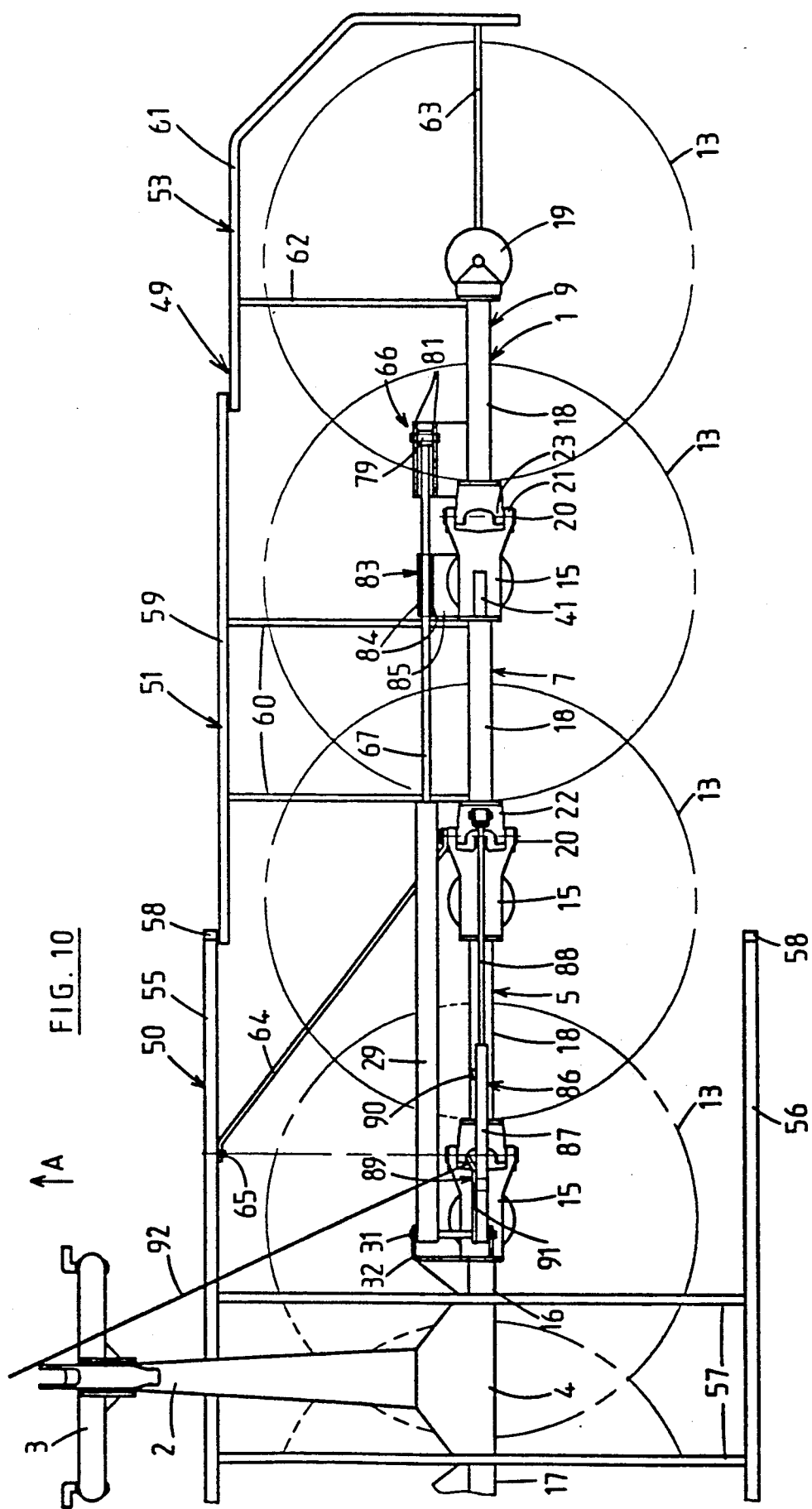
FIG. 10 represents a partial top view of a third embodiment of a machine according to the invention, in the working position.
Figure 11:
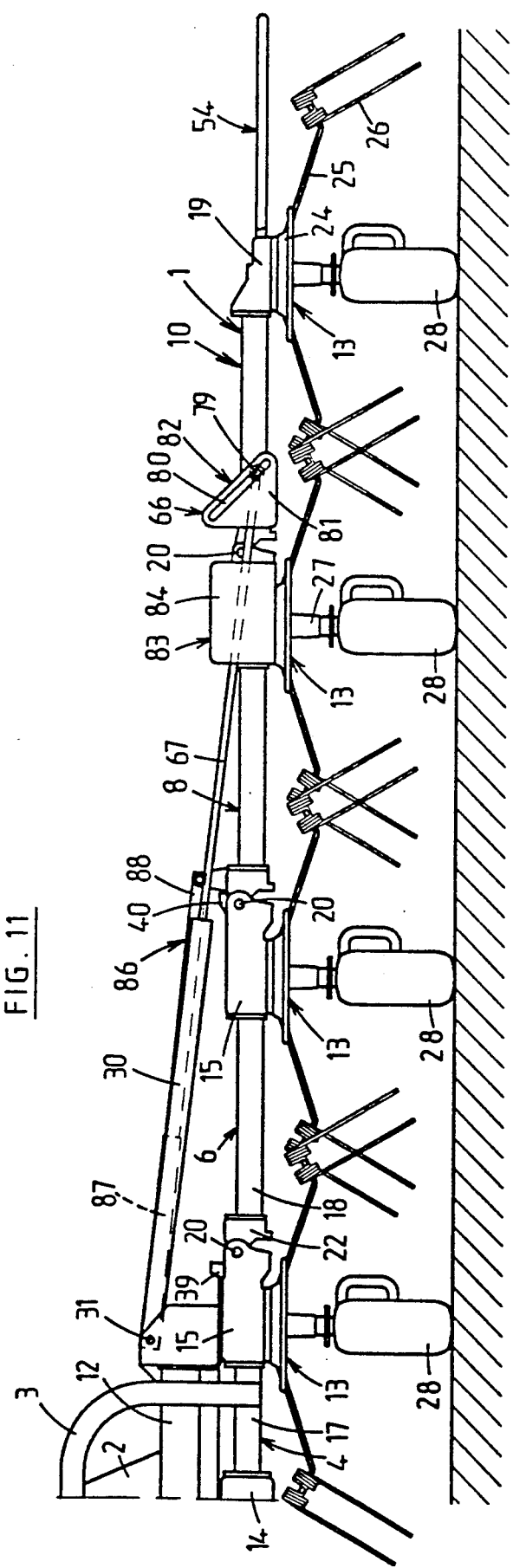
FIG. 11 represents a partial front view of the machine according to FIG. 10.
Figure 12:
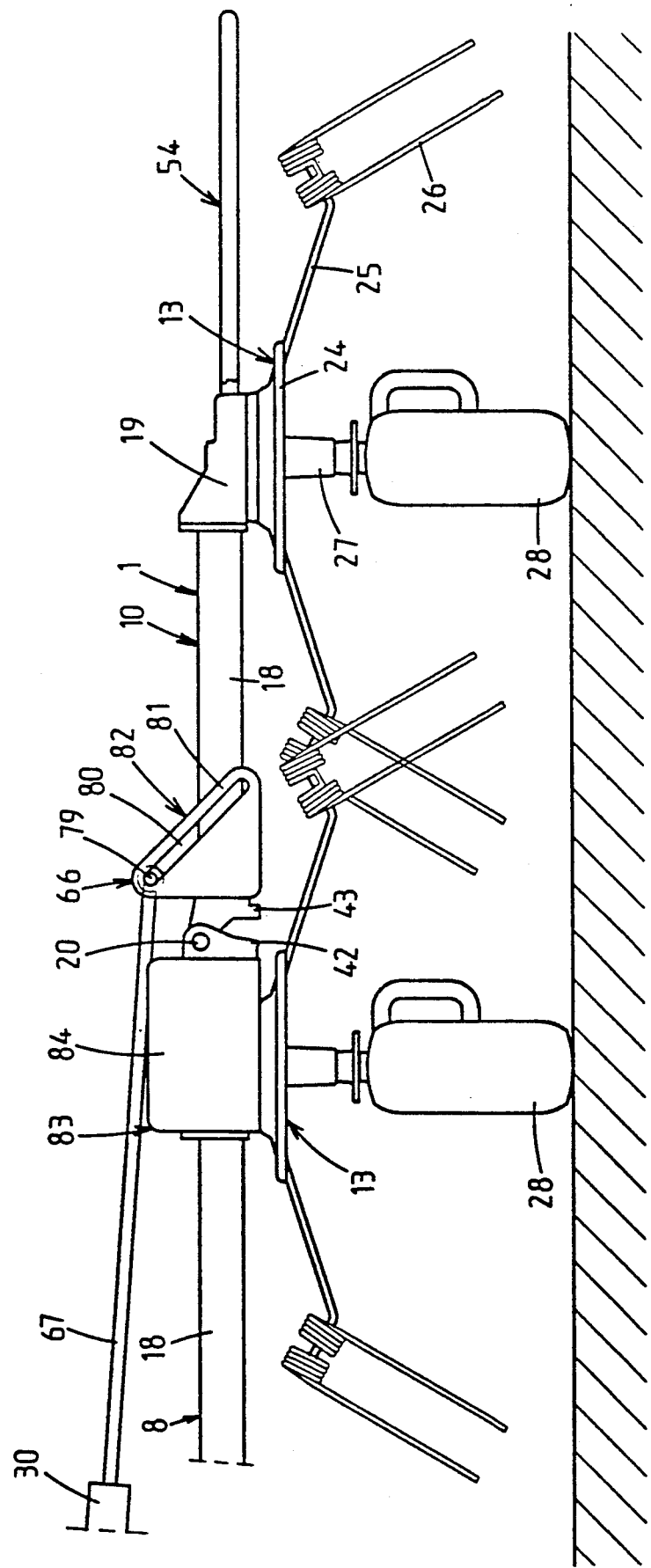
FIG. 12 represents a detail view of the machine according to FIGS. 10 and 11, at the beginning of the first phase of transposition into the transporting position.

In addition, this machine comprises two telescopic stopping devices (86) to support lateral sections (5 to 10) (see in particular FIGS. 10 and 11). Each of these devices (86) is located above one of first lateral sections (5, 6) and consists of two telescopic bars (87 and 88), one of which is connected to central section (4) and the other to joining piece (22) of second lateral section (7 or 8). Bar (88) is able to slide within the other bar (87). The latter has a C-shaped section. It also comprises a stop to limit the outward movement of sliding bar (88).

In addition, each stopping device (86) carries a locking device (89) making it possible to immobilize two bars (87 and 88) when the sliding bar is engaged to the maximum in the other bar. For this purpose, sliding bar (88) comprises a lateral tenon (90) which slides into the opening of the C-shaped section of other bar (87). To the latter is attached a spring-steel plate (91), which is equipped with a hole in which tenon (90) can be housed. The latter occurs automatically when sliding bar (88) totally enters the other bar (87). Said plate (91) then locks the two bars (87 and 88). The latter also consequently immobilize lateral sections (5 to 10) in the folded position for transport. A maneuvering cable (92) is connected to plate (91). By pulling on the latter, plate (91) is separated and tenon (90) is freed. In this manner, the two bars the (87 and 88) and lateral sections (5 to 10) can be unlocked. Each cable (92) advantageously extends forward so as to be accessible from the tractor seat.

In the embodiment represented in FIGS. 14 to 18, frame (1) of the machine and rotors (13) are also comparable to those of the examples described above. Means (66) are provided between each hydraulic cylinder (29, 30) and corresponding third lateral section (9, 10) to assure a large lever arm. For each cylinder (29, 30), these means consists of a disk (93) integral with its rod (67), said disk (93) is housed between two guides (94 and 95) and comprises a journal (96) whose two ends are located in identical Orifices (97) provided in two plates (98) connected to corresponding third lateral section (9, 10). These plates (98) are parallel to one another and form a yoke (99). Journal (96) of each disk (93) is eccentric and is located near the edge of the latter. orifices (97) exhibit two branches (109, 110) arranged in the shape of a T. Guides (94 and 95) of each disk (93) and upper branches (109) of orifices (97) are approximately parallel to pipe (18) of the third lateral section (9, 10). Branches (110) of orifices (97) are approximately perpendicular to said pipe. Guide (94) is located above said disk (93) and the other guide (95) is below the latter when the corresponding third lateral section (9, 10) is in an approximately horizontal position (see FIG. 14 or 15). Lower guide (95) consists of a brace extending between two plates (98). Upper guide (94) consists of two rails, each of which is attached to one of plates (98). These rails are spaced from one another to allow clear passage for rod (67) of hydraulic cylinder (29 or 30).

The machine of the embodiment according to FIGS. 19 to 23 is constructed in the same manner as those of the examples described above except with respect to means (66) which assures a large lever arm when hydraulic cylinders (29, 30) act on lateral sections (5 to 10). For each of these cylinders (29, 30), these means (66) consist of a journal (100), which is integral with rod (67) and which is engaged in a T-shaped orifice (101) of a plate (102), and a lug (103) also integral with rod (67), said lug (103) is approximately perpendicular to said rod (67) and comprises another journal (104) which is housed in an oblong orifice (105) of a plate (106). These plates (102 and 106) are approximately parallel to one another and are connected to pipe (18) of third lateral section (9, 10). As seen in direction of movement (A), plate (102) is located behind rod (67) while plate (106) is located in front of said rod. As a result, journal (100) extends rearward and the other journal (104) forward. In addition, they are eccentric relative to one another. It is evident in particular from FIG. 20 that T-shaped guiding orifice (101) comprises a branch (107) which is approximately perpendicular to pipe (18) and a shorter branch (108), which is approximately parallel to said pipe. Oblong orifice (105) is approximately parallel to branch (108). It extends approximately middistance between the two ends of branch (107). The length of this orifice (105) is determined relative to a plane of symmetry (S) of orifice (101). Starting from this plane (S), it extends, on one side, in the direction of outside rotor (13) as far as branch (108) of orifice (101) and, on the other side, in the direction of rotor (13) of second lateral section (7, 8), over a distance equal to half of the length of branch (107) of orifice (101).

In the working position, the machine according to the first embodiment occupies the position represented in FIGS. 1 and 2. It is then coupled to a tractor and can be moved by the latter in the direction of arrow (A). All lateral sections (5 to 10) are deployed and are carried by small wheels (28) which rest on the ground. Rotors (13) are rotatably driven around support shafts (27) so as to rotate two by two for forward convergence. Their forks (26) then gather the products, for example, cut blades of grass, which are on the ground, moving them backward and spreading them again while causing their turning action. Various rotors (13) can follow the uneven contour of the ground by pivoting with sections (4 to 10) around joint pins (20) of the latter. In the horizontal position, journals (33) of hydraulic cylinders (29, 30) are located in the center of orifices (34). Third lateral sections (9, 10) thus can pivot freely upward and downward around their joint pins (20).

Figure 5:
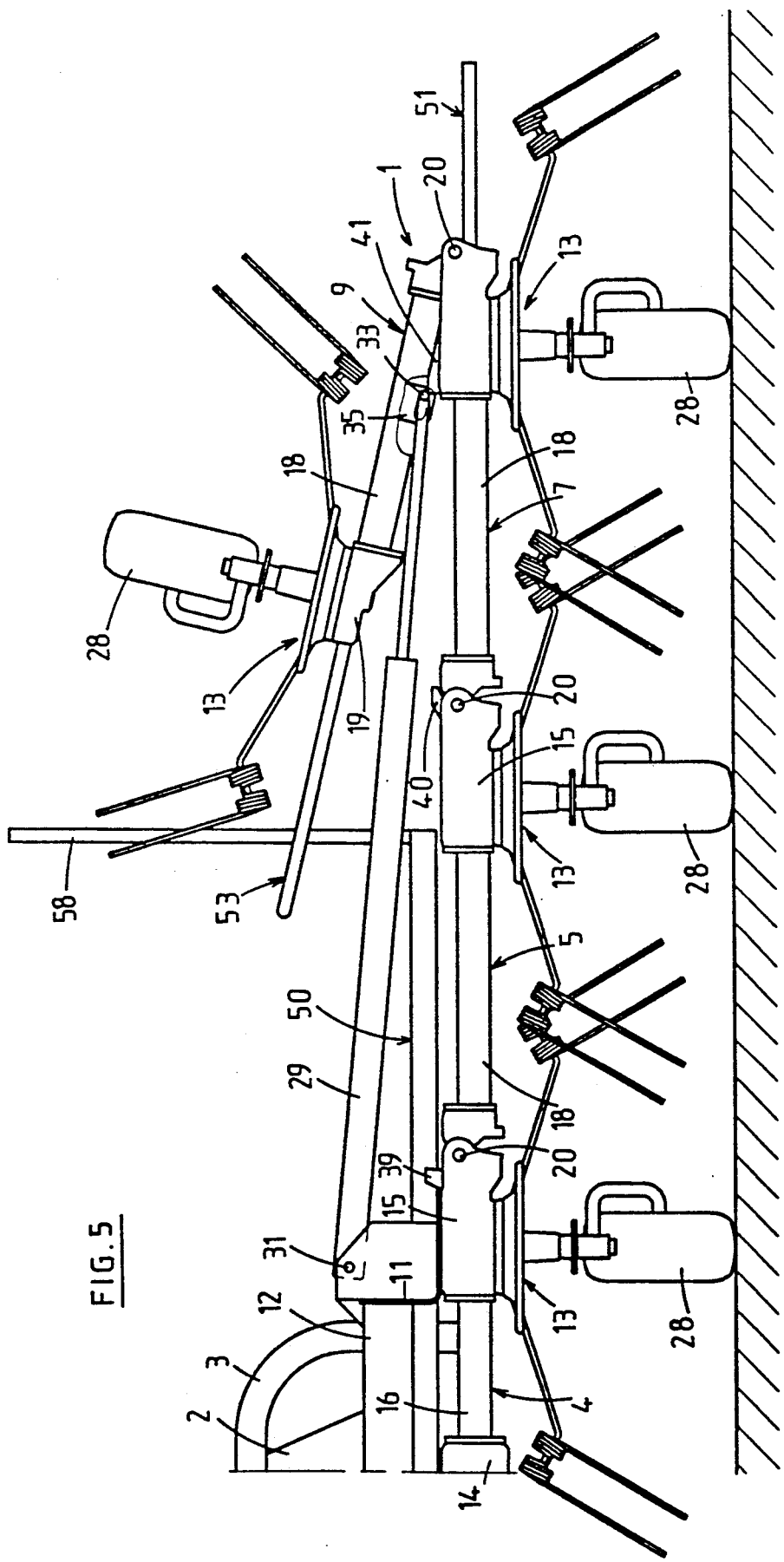

To bring this machine into the transporting position, hydraulic cylinders (29, 30) are actuated so that they are retracted. Their journals (33) then move until they are in the ends of orifices (34). Then, in a first phase, third lateral sections (9, 10) pivot around their joint pins (20) with second sections (7, 8) until they touch stops (41) provided on the latter (FIG. 5). The pivoting angle of each of these third lateral sections (9, 10) has a value between 150° and 180°. It should be noted that during this entire phase, journals (33) remain in the same ends of orifices (34) so that hydraulic cylinders (29, 30) constantly hold these sections (9, 10) and prevent them from swinging freely toward second lateral sections (7, 8) when they have projected beyond the vertical position (see FIGS. 4 and 5). In a second phase, journals (33) move in the opposite ends of orifices (34) and drive third and second lateral sections (9, 10 and 7, 8) around joint pins (20) with first lateral sections (5, 6). This pivoting takes place until joining pieces (22) of the second lateral sections (7, 8) encounter stops (40). The pivoting angles around these joint pins (20) have a value between 5° and 12°.

In a third phase, all lateral sections (5 to 10) pivot together relative to central section (4) around joint pins (20) with the latter, until they come to the position represented in FIG. 3. These pivotings are limited by stops (39) provided on housings (15) of central section (4). The value of the pivoting angles is between 75° and 90°. As soon as hydraulic cylinders (29, 30) are completely retracted, the ends directed forward of journals (33) automatically lift plates (48) of locking devices (44) and engage in the orifices provided in said plates. The latter then lock hydraulic cylinders (29, 30) and, by the latter, also lateral sections (5 to 10) of frame (1) of the machine.

In this position, first and second lateral sections (5, 6 and 7, 8) are directed upward while third lateral sections (9, 10) are directed downward starting from their respective joint pins. The width and the height of the machine thus are small so that it can be moved without difficulty on roads and paths. This position can also advantageously be used to store the machine during the periods of the year when it is not used.

To deploy lateral sections (5 to 10) to transpose the machine into the working position, it is necessary first to pull on cables (46) to move levers (45) and plates (48) so that the latter free journals (33). Hydraulic cylinders (29, 30) can then be actuated so that they are extended. In a first phase, all lateral sections (5 to 10) pivot downward around joint pins (20) with central section (4). This pivoting is performed essentially under the effect of the characteristic weight of lateral sections (5 to 10). Hydraulic cylinders (29, 30) then make it possible essentially to control the descent of said lateral sections. When first and second lateral sections (5, 6 and 7, 8) touch the ground, hydraulic cylinders (29, 30) push journals (33) into the opposite ends of orifices (34) and exert pressure on third sections (9, 10) (FIG. 5). During this second phase, these third sections (9, 10) pivot toward the outside, around their joint pins (20), until their small wheels (28) also touch the ground. During working operation the stresses being exerted on lateral sections (5 to 10) as a result of movements on the ground are partially supported by tie rods (64). The latter thus relieve in particular joints (20) with central section (4). During the movements from the working position into the transporting position and conversely, these tie rods (64) pivot with first lateral sections (5, 6). Also, during these movements, parts (51, 52 and 53, 54) of protective device (49) pivot respectively with second and third lateral sections (7, 8 and 9, 10). In the case where the machine is to be lifted while it is in deployed position, hydraulic cylinders (29 and 30) support a part of the weight of lateral sections (5 to 10). This prevents too strong a stress being applied to their stops (42 and 43) and makes it possible to withdraw all small wheels (28) from the ground.

Figure 6:
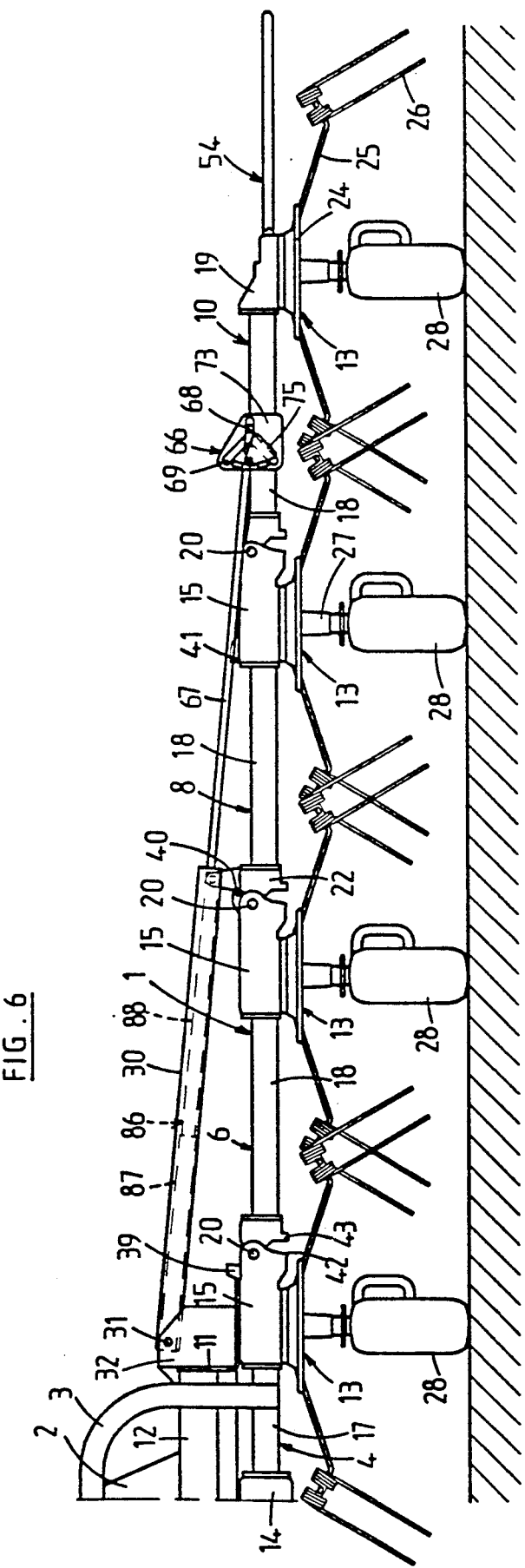
FIG. 6 represents a partial front view of a second embodiment of a machine according to the invention, in the working position.
Figure 7:
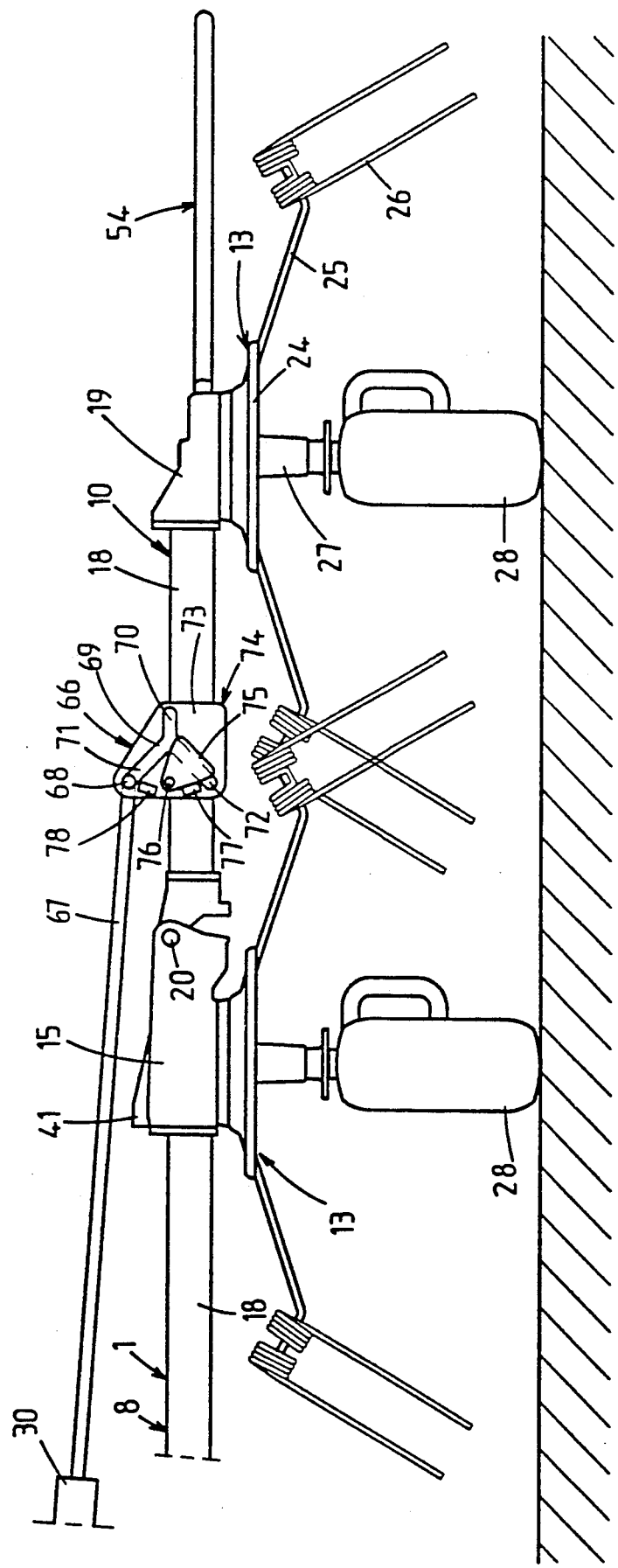
FIG. 7 represents a detailed view of the machine according to FIG. 6, at the beginning of the first phase of transposition into the transporting position.

In the machine according to the embodiment of FIGS. 6 to 9, all rotors (13) are also approximately aligned and rotatably driven in the working position (see FIG. 6). Journals (68) of hydraulic cylinders (29, 30) then are located approximately at the center of branches (70) of orifices (69). Third lateral sections (9, 10) thus can move at a certain angle relative to hydraulic cylinders (29, 30) to follow the uneven contour of the ground well. In this working position, guides (75) are swung downward in the direction of the ground and close the access to branches (72) of orifices (69).

For transporting, lateral sections (5 to 10) and their rotors (13) are folded and occupy the same position as that represented in FIG. 3. To bring the lateral sections (5 to 10) into this position, hydraulic cylinders (29, 30) are actuated so that they are retracted. Their journals (68) then move into orifices (69) and automatically rise in oblique branches (71). These journals (68) thus move upward relative to joint pins (20), which has the effect of increasing the lever arm when hydraulic cylinders (29, 30) pull on third lateral sections (9, 10) (see FIG. 7). The latter then pivot, in a first phase, around joint pins (20) with second lateral sections (7, 8) until they encounter stops (41). During this pivoting, journals (68) remain in the ends of branches (71) and hold third lateral sections (9, 10).

Figure 8:
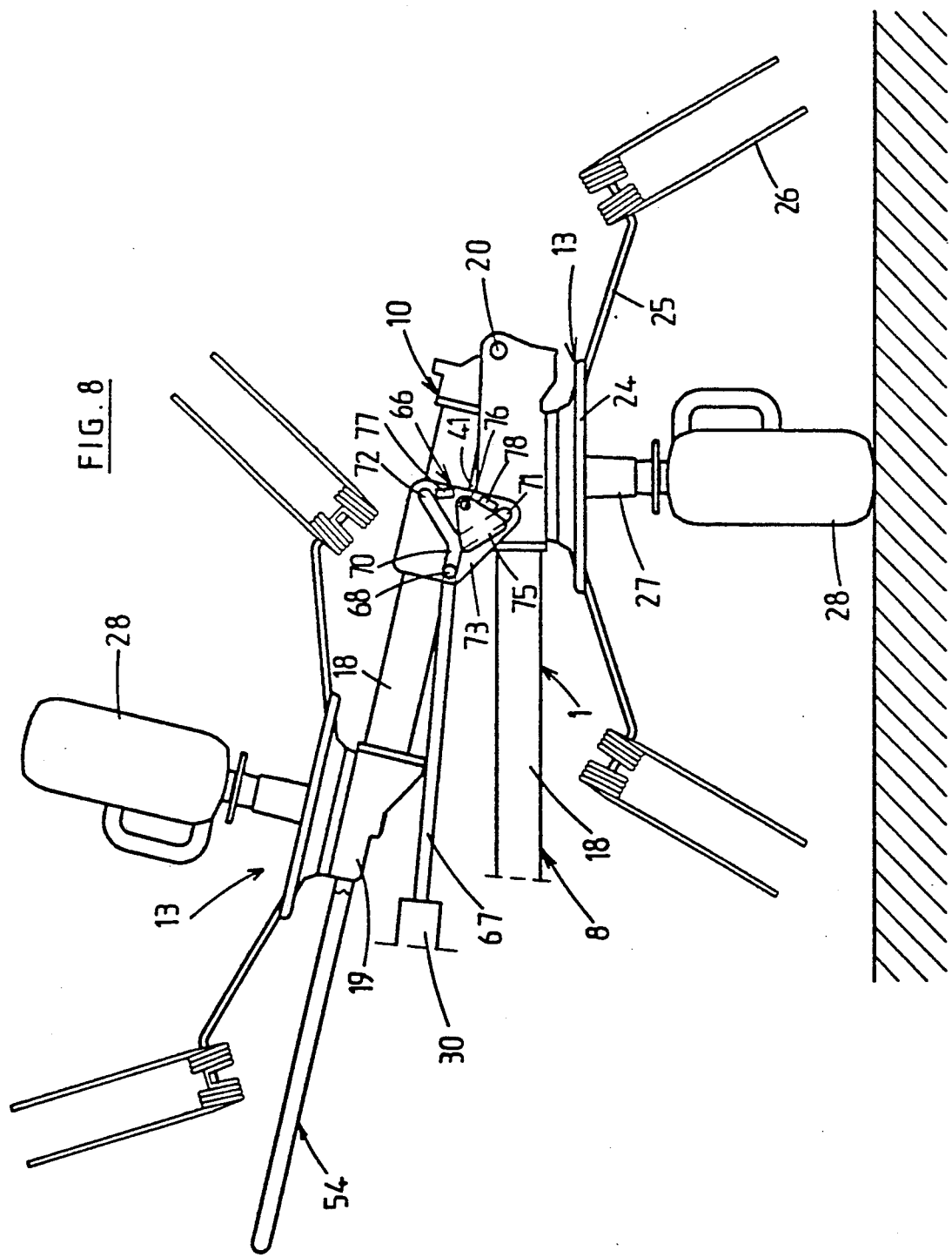
FIG. 8 represents a view similar to that of FIG. 7, at the beginning of the second phase of transposition into the transporting position.
Figure 9:
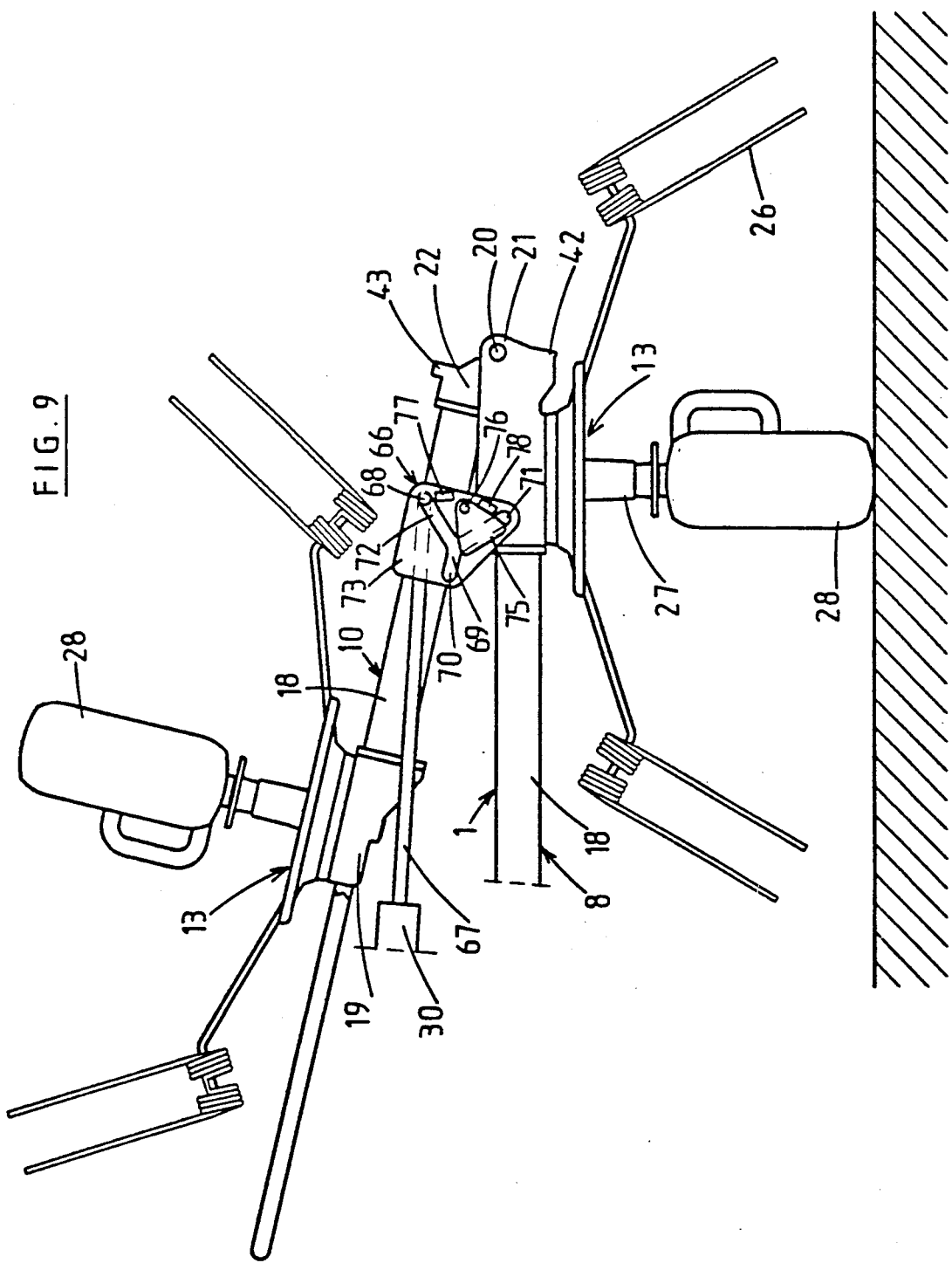
FIG. 9 represents a detailed view of the machine according to FIG. 6, at the beginning of the deployment phase of the third lateral sections during being deployed into the working position.

As soon as these third sections (9, 10) rest on stops (41), the journals (68), as a result of the traction of hydraulic cylinders (29, 30), go out of branches (71) of orifices (69) and automatically engage in branches (70). Starting from this position which is represented in FIG. 8, the second phase begins. During the latter, the third and second lateral sections (9, 10 and 7, 8) pivot around their joint pins (20) with first lateral sections (5, 6) until they encounter stops (40) provided on housings (15) of the latter. In the next phase, all lateral sections (5 to 10) pivot around the joint pins (20) with central section (4) until they are in the transporting position.

Conversely, to deploy lateral sections (5 to 10), hydraulic cylinders (29, 30) are actuated so that they are extended. In the first phase, all lateral sections (5 to 10) pivot downward until the small wheels (28) of rotors (13) of first and second sections (5, 6 and 7, 8) touch the ground. Journals (68) and hydraulic cylinders (29, 30) then are located in the position illustrated in FIG. 8. Mobile guides (75) then are placed under the effect of their own weight against stops (78) and prevent journals (68) from gaining access to branches (71). Thus, under the effect of the pressure of hydraulic cylinders (29, 30), journals (68) automatically engage in branches (72) which are directed upward (see FIG. 9). The lever arms with which said cylinders push on third lateral sections (9, 10) are thus increased. These sections (9, 10) then pivot toward the outside, around their joint pins (20), until their small wheels (28) touch the ground.

This machine also comprises stopping devices (86) identical with those described in connection with the embodiment according to FIGS. 10 to 13. During the transpositions of second lateral sections (7, 8), sliding bars (88) of these devices (86) slide relative to stationary bars (87). In the transporting position, these two bars (87 and 88) are locked relative to one another so that they immobilize lateral sections (5 to 10). In the working position, bars (88) slide in bars (87) to make it possible for lateral sections (5 to 10) to follow the uneven contour of the ground. However, when the machine is lifted in the deployed position, these devices (86) partially carry lateral sections (5 to 10). They thus prevent crushing of the stops (42 and 43) of the joints (20) between the central section (4) and the first lateral sections (5, 6) and between the latter and the second lateral sections (7, 8). They also make possible the withdrawal from the ground of all small wheels (28).

Figure 13:
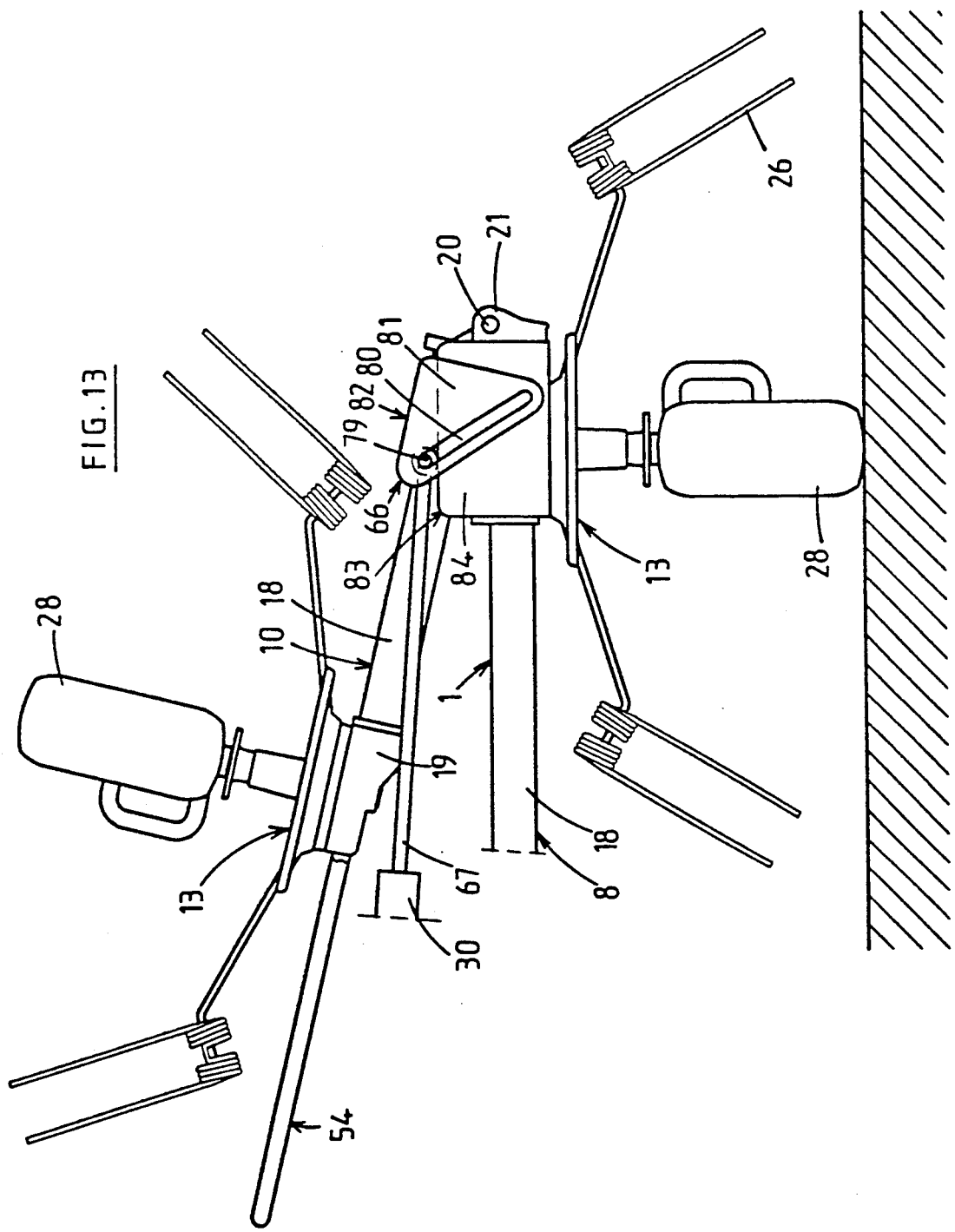
FIG. 13 represents a view similar to that of FIG. 12, at the beginning of the second phase of transposition into the transporting position.
Figure 14:
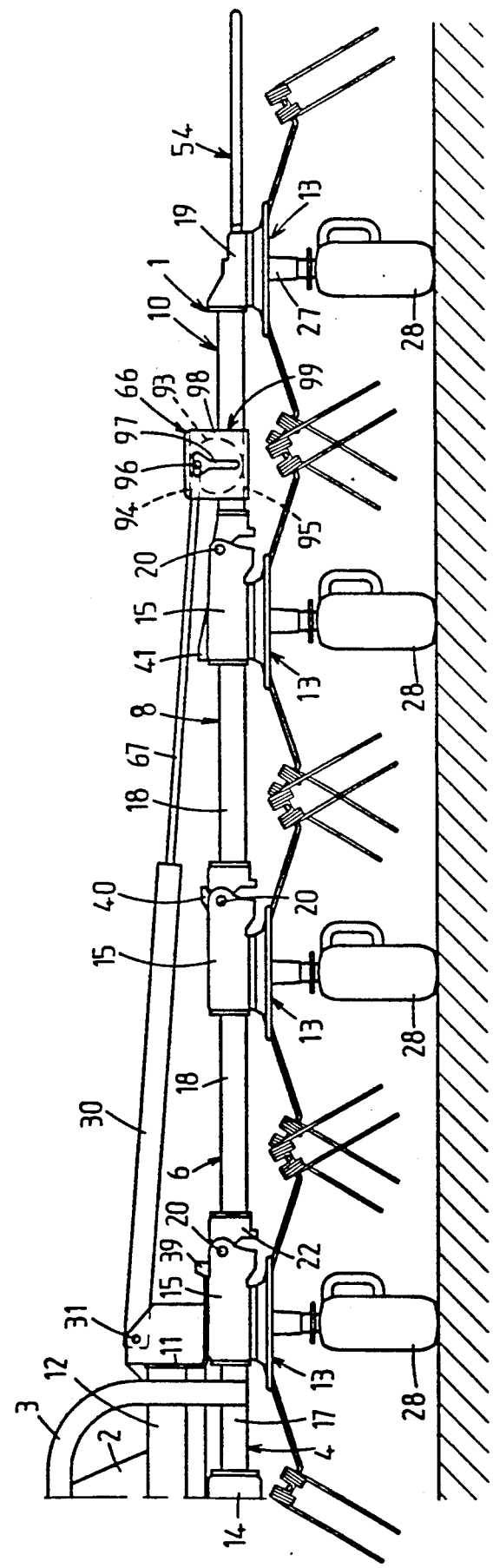
FIG. 14 represents a partial front view of a fourth embodiment of a machine according to the invention, in the working position.
Figure 15:
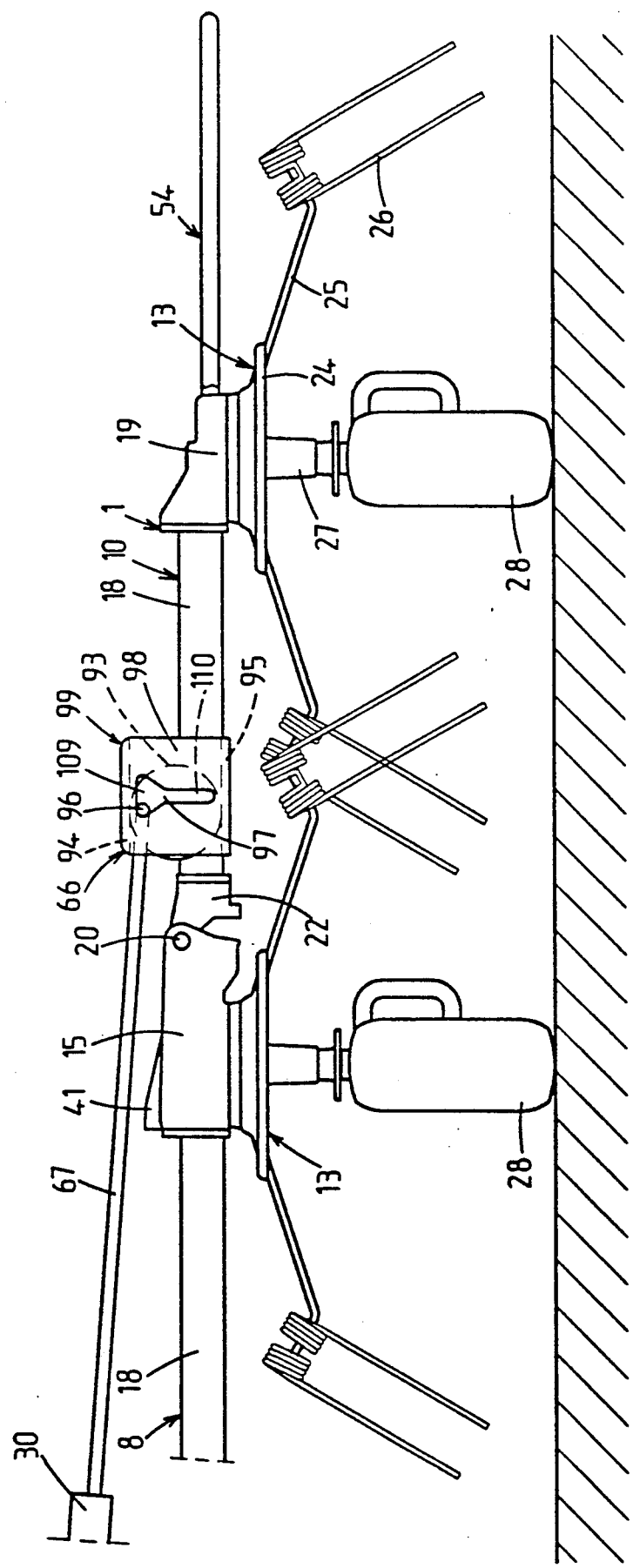
FIG. 15 represents a detailed view of the machine of FIG. 14, at the beginning of the first phase of transposition into the transporting position.

In the embodiment according to FIGS. 10 to 13, sections (4 to 10) of frame (1) and rotors (13) occupy the same working and transporting positions as in the above-mentioned examples. As is evident in particular from FIGS. 10 and 11, journals (79) of hydraulic cylinders (29, 30) are located in the lower third of orifices (80) in the working position. When these cylinders (29, 30) are actuated to bring the machine into the transporting position, said journals (79) first move upward in the orifices (80). They then are placed in the position represented in FIG. 12, in which the lever arms, when hydraulic cylinders (29, 30) pull on third lateral sections (9, 10), are large. In a first phase, the latter pivot around their joint pins (20) until they touch stops (41) provided on housings (15) of second lateral sections (7, 8). It is seen in FIG. 13 that during this pivoting, two plates (81) of each third lateral section (9, 10) straddle one of guiding devices (83). These devices then stop journals (79) so that they automatically slide until in the other end of orifices (80) as third lateral sections (9, 10) pivot downward after having passed the vertical position. By so doing, journals (79) hold third lateral sections (9, 10) and prevent them from swinging suddenly toward stops (41). Then, the second and third phase immediately follow during which the lateral sections (5 to 10) are moved upward and are brought into a transporting position identical with that which is represented in FIG. 3. In this position, the sliding bars (88) of the stopping devices (86) are retracted and the tenons (90) are housed in the holes provided in plates (91). The latter then lock the sliding bars (88), and, by the latter, immobilize the lateral sections (5 to 10).

To transpose the machine into the working position, it is necessary to free the tenons (90) by releasing the plates (91) with cables (92) and to actuate the hydraulic cylinders (29, 30) so that they are extended. Lateral sections (5 to 10) then pivot downward until small wheels (28) of the rotors (13) of the first and second lateral sections (5, 6 and 7, 8) touch the ground. Hydraulic cylinders (29, 30) and journals (79) then again occupy the position represented in FIG. 13, in which they are located clearly above joint pins (20). Then cylinders (29, 30) push with a large lever arm on third lateral sections (9, 10) so that they pivot around their joint pins (20). During this pivoting action, journals (79) slide on guiding devices (83) and gradually move into the opposite ends of orifices (80). Thus, as soon as sections (9, 10) have projected beyond the vertical position and as soon as they descend toward the ground under of the effect of their own weight, the hydraulic cylinders (29, 30) hold them to prevent sudden swings.

Stopping devices (86) also are extended when the lateral sections (7, 8) move into the working position. However, if the machine is lifted by the lifting device of the tractor, these stopping devices (86) partially carry lateral sections (5 to 10).

Figure 16:
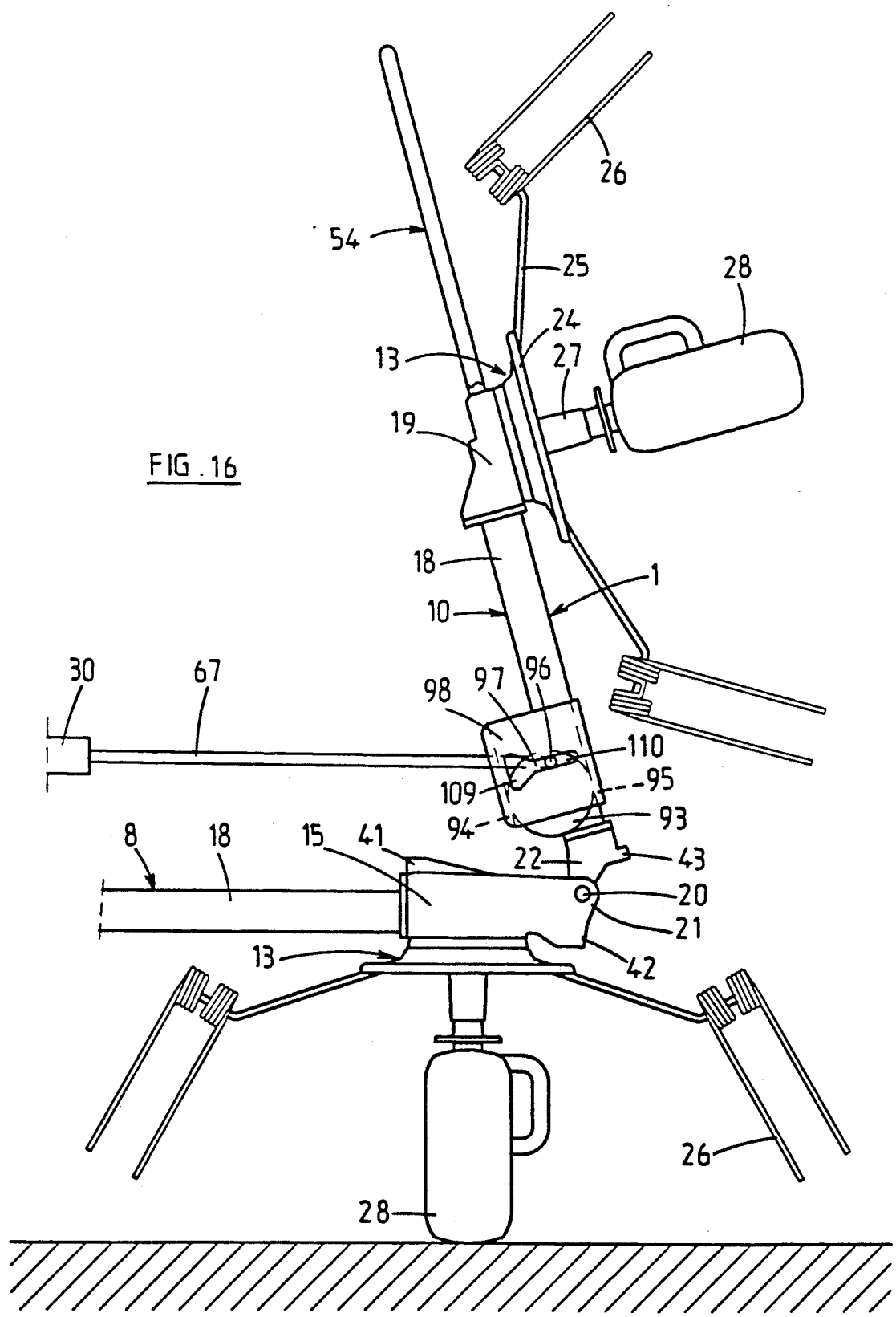
FIG. 16 represents a detailed view of the machine according to FIG. 14, during pivoting of the third lateral sections, FIG. 17 also represents a detailed view of the machine according to FIG. 14, at the beginning of the second phase of transposition into the transporting position.
Figure 17:
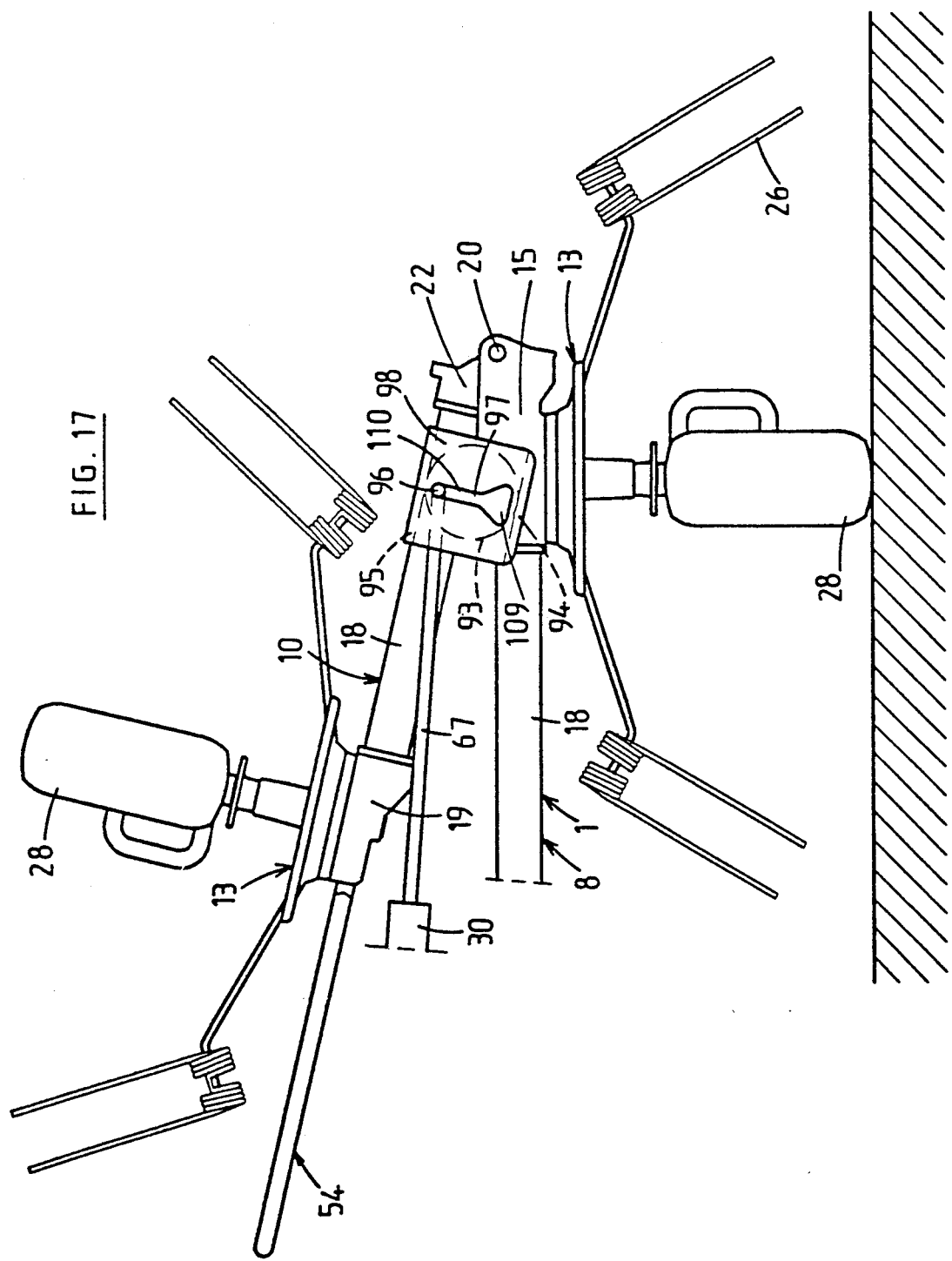
Figure 18:
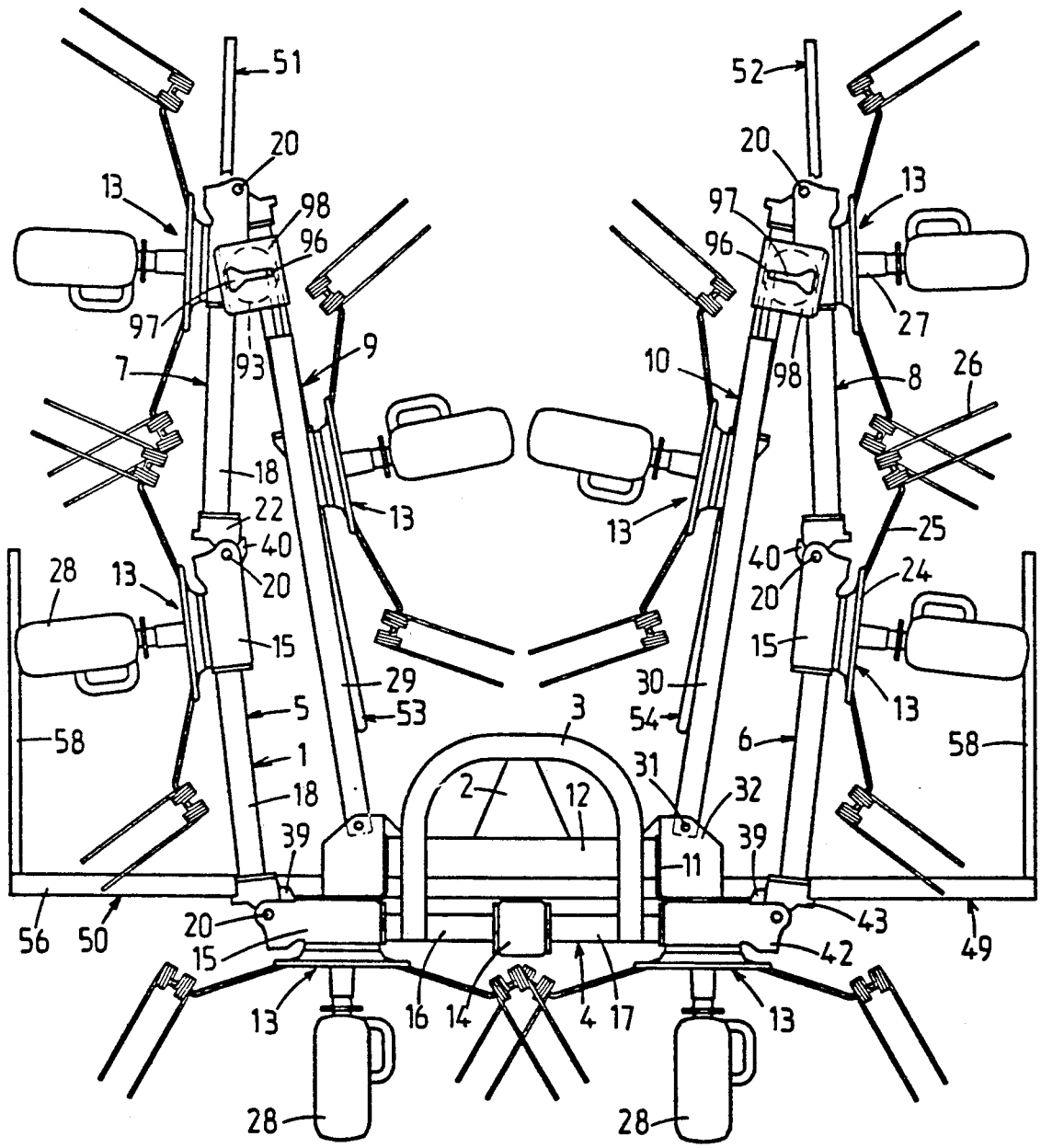
FIG. 18 represents the machine according to FIG. 14 in the transporting position.
Figure 19:
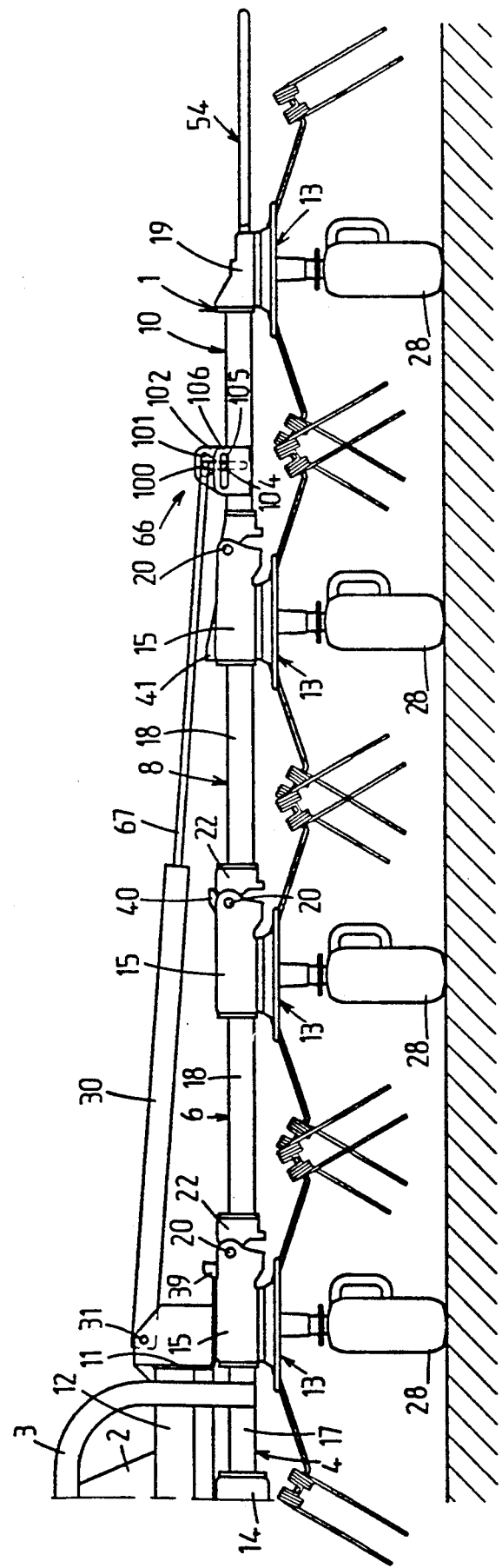
FIG. 19 represents a partial front view of a fifth embodiment of a machine according to the invention, in the working position.

In the embodiment according to FIGS. 14 to 18, lateral sections (5 to 10) and rotors (13) also occupy the same positions during working and transporting as those which have been described in connection with the embodiment of FIGS. 1 to 5. When rotors (13) are in the working position such as that represented in FIG. 14, journals (96) of hydraulic cylinders (29, 30) are located in upper branches (109) of orifices (97). Plates (98) thus can move a certain distance relative to said journals to make it possible for lateral sections (5 to 10) to follow the uneven contour of the ground. To bring these lateral sections (5 to 10) into the transporting position represented in FIG. 18, it is necessary to actuate hydraulic cylinders (29, 30) so that they are retracted. Since journals (96) are located in the top of orifices (97), hydraulic cylinders (29, 30) pull with a large lever arm on third lateral sections (9, 10). In the first phase, journals (96) strike the ends of upper branches (109) (FIG. 15) and then third lateral sections (9 and 10) pivot around their joint pins (20) until they touch stops (41) on the housings (15) of the second lateral sections (7, 8) (FIGS. 16 and 17). During this pivoting action, journals (96) and disks (93) move relative to third lateral sections (9, 10). Said journals thus slide in branches (110) of orifices (97) so that at the end of the first phase, they are again clearly located above joint pins (20). Disks (93) are constantly located between guides (94 and 95) and work with them to prevent third lateral sections (9, 10) from swinging suddenly around their joint pins (20).

After this first phase of pivoting, hydraulic cylinders (29, 30) continue their traction and successively execute the second and third phase. In the transporting position (FIG. 18), lateral sections (5 to 10) can be immobilized by locking devices (44) identical with those represented in FIG. 1.

To transpose the machine from the transporting position into the working position, it is necessary to unlock the hydraulic cylinders (29, 30) and to actuate them so that they are extended. Lateral sections (5 to 10) then pivot downward until the small wheels (28) of rotors (13) of first and second lateral sections (5, 6 and 7, 8) touch the ground. In this position (FIG. 17), journals (96) are located clearly above a horizontal plane passing through joint pins (20) of third sections (9, 10). Hydraulic cylinders (29, 30) then push on these third sections (9, 10) with a large lever arm, so as to make them pivot around their joint pins (20). During this pivoting action, disks (93) and guides (94 and 95) again prevent sections (9, 10) from swinging freely around joint pins (20) and journals (96) gradually take up the position represented in FIG. 14.

The machine of the embodiment which is illustrated in FIGS. 19 to 23 exhibits in the working position and in the transporting position the same characteristics as the machines which have been described above. It is clearly evident from FIG. 19 that lateral sections (5 to 10) are deployed during working operation. Likewise, during transport (FIG. 23), first and second lateral sections (5, 6 and 7, 8) are directed upward and third lateral sections (9, 10) are directed downward.

Figure 20:
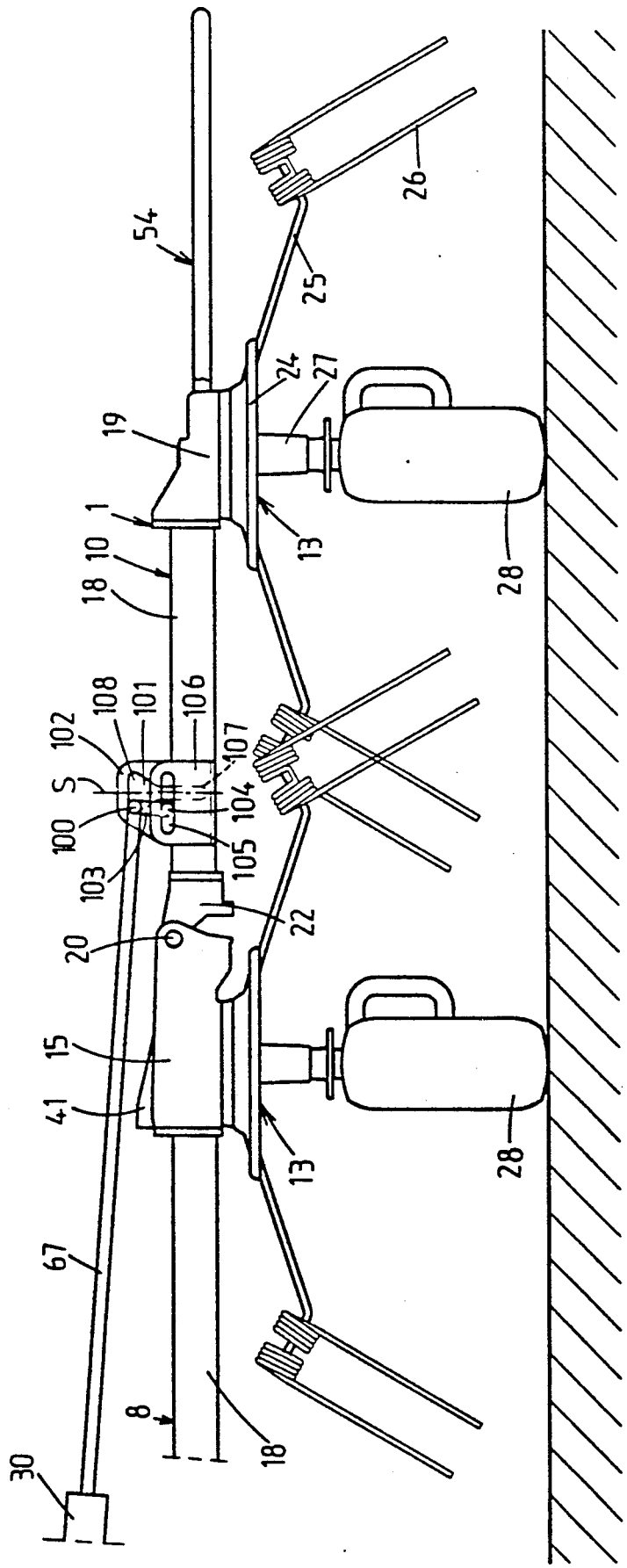
FIG. 20 represents a detailed view of the machine according to FIG. 19, at the beginning of the first phase of transposition into the transporting position.
Figure 21:
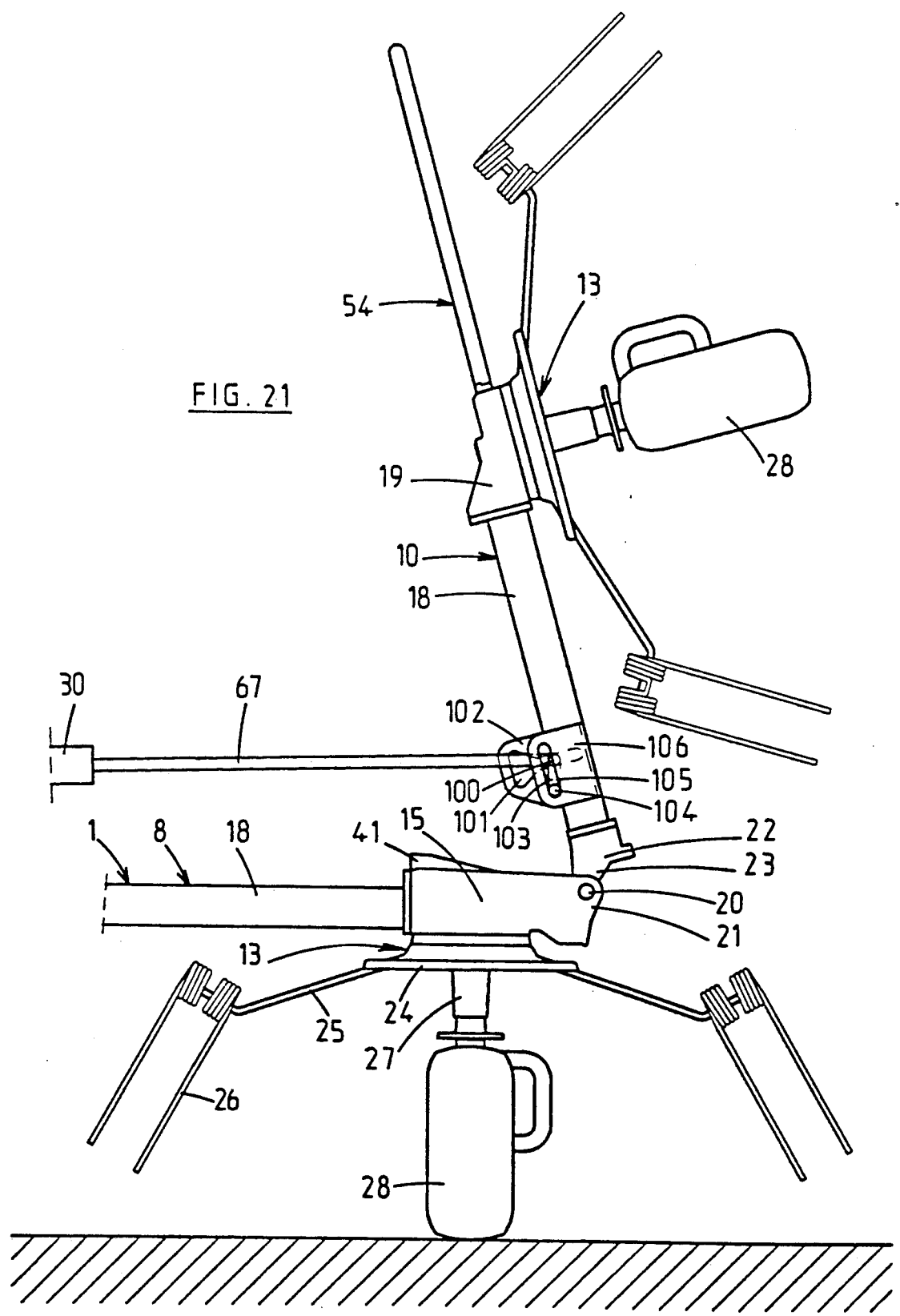
FIG. 21 represents a detailed view of the machine according to FIG. 19, during pivoting of the third lateral sections.

During working operation, plates (102 and 106) can move relative to journals (100 and 104) to make it possible for lateral sections (5 to 10) to follow the uneven contour of the ground. To bring these lateral sections (5 to 10) into the transporting position, hydraulic cylinders (29, 30) are actuated so that they are retracted. Then, journals (100 and 104) move respectively into orifices (101 and 105) until the journals (100) reach the ends of branches (108), as is represented in FIG. 20. These journals (100) then drive third sections (9, 10) and make them pivot around their joint pins (20). Because of the great distance between these journals (100) and a horizontal plane passing through joint pins (20), the force of lever arms exerted by hydraulic cylinders (29, 30) on the third lateral sections (9, 10) is large. During pivoting of these sections (9, 10), journals (100) gradually move into branches (107) of orifices (101), while other journals (104) advance into their orifices (105) (see FIG. 21).

Figure 22:
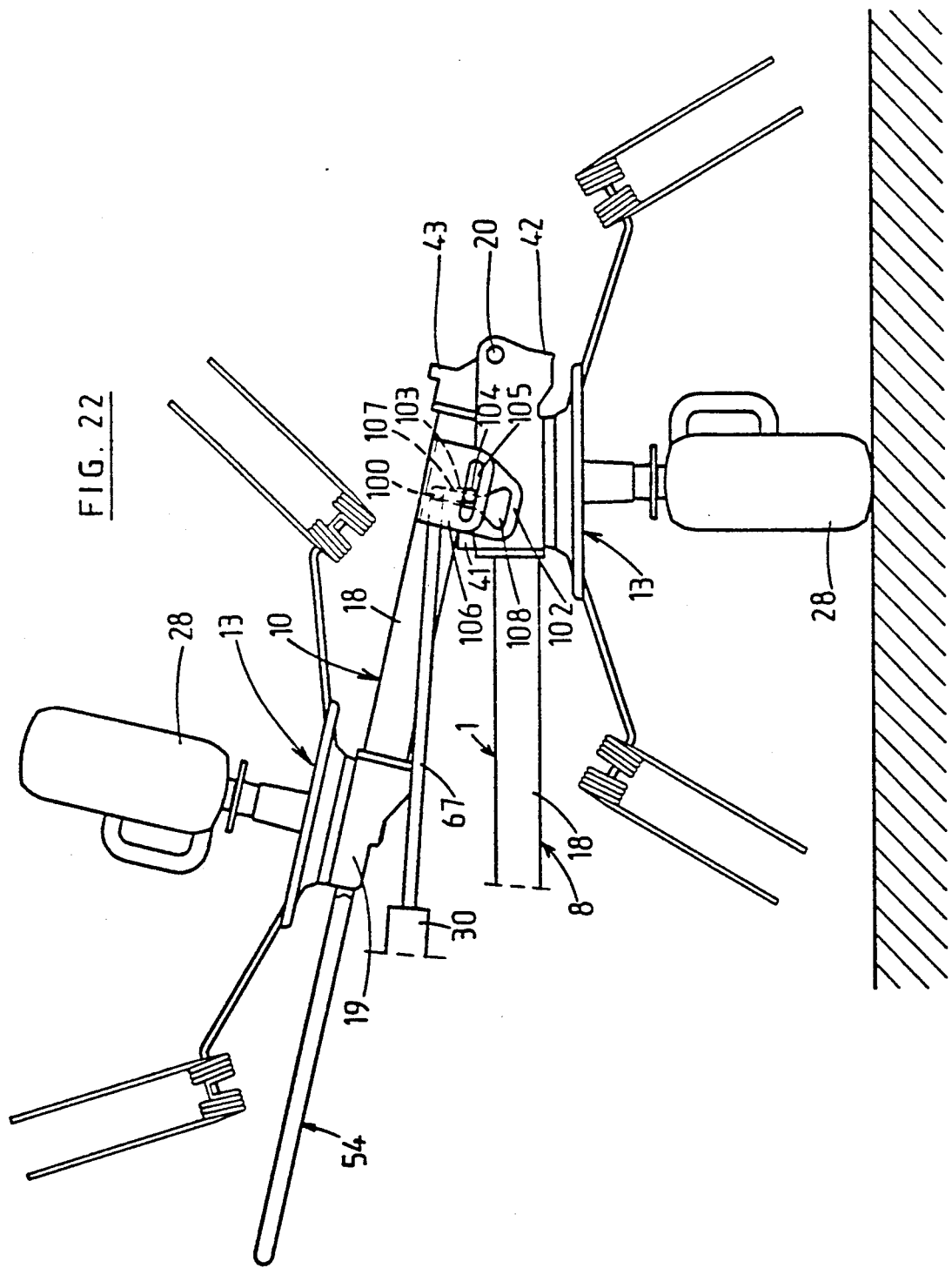
FIG. 22 represents another detailed view of the machine according to FIG. 19.

On each side of the machine, two journals (100 and 104) then work together to make third lateral sections (9, 10) pivot and prevent them from swinging. From the end of the first phase of pivoting, journals (100) are located in the ends of branches (107). This position is represented in FIG. 22. They are thus again distant from a horizontal plane passing through joint pins (20). Hydraulic cylinders (29, 30) then make lateral sections (5 to 10) pivot following the second and the third phase to bring them into the transporting position. Locking devices (44) can also be provided to lock lateral sections (5 to 10) in this position.

To bring lateral sections (5 to 10) into the working position, the hydraulic cylinders (29, 30) are actuated so that they are extended. In a first step, all sections (5 to 10) pivot downward until the small Wheels (28) of the rotors (13) of first and second lateral sections (5, 6 and 7, 8) touch the ground. This pivoting is performed essentially under the effect of the characteristic weight of these sections (5 to 10), hydraulic cylinders (29, 30) being used in particular to control the descent. Then, the hydraulic cylinders (29, 30) push on third sections (9, 10) so that they pivot toward the outside around their joint pins (20). Since the journals (100) again occupy, at the beginning of this phase, the position represented in FIG. 22, hydraulic cylinders (29, 30) push on sections (9, 10) with a large lever arm. During this pivoting, journals (100) return toward branches (108) of their orifices (101) and journals (104) perform a back and forth movement in orifices (105). These journals (100 and 104) also constantly assure a positive connection between hydraulic cylinders (29, 30) and plates (102, 106) of sections (9, 10) so that the latter cannot swing freely.

It is quite obvious that the present invention is not limited to the embodiments which are described and represented in the accompanying drawings. Modifications are possible, in particular concerning the composition of various elements or by substitution of equivalent techniques, without thereby going outside the field of protection as defined in the claims.

What is claimed as new and desired to be secured by Letters Patent of the United States is:

1. A haymaking machine for being coupled to a tractor and which comprises a frame carrying a plurality of rotors driven in rotation during working operation by transmission elements which are housed in the frame
said frame including:
a central section
a first, second and third lateral section placed on each side of said central section, said central and said lateral sections being connected to one another by pins oriented so as to extend in the direction of movement of the machine
wherein each of said lateral section comprises a pipe and a housing equipped with a rotor
and wherein a hydraulic cylinder extends directly from said central section to each third lateral section for transporting said lateral sections into a working position in which said lateral sections are approximately aligned and a transporting position in which said lateral sections are folded about said pins, so that said first and second lateral sections being directed upward and the third lateral section being directed downward starting from their respective pins.

2. A machine according to claim 1, wherein, in a horizontal position, each hydraulic cylinder is more distant from the ground than the pins between said sections.

3. A machine according to claim 2, wherein each hydraulic cylinder is located in front of said lateral sections.

4. A machine according to claim 1, wherein each hydraulic cylinder comprises, at an end thereof which is connected to the third lateral section, a journal which is housed in an oblong orifices provided in a yoke which is integral with said third lateral section.

5. A machine according to claim 4, wherein said oblong orifices are substantially parallel to the third lateral section.

6. A machine according to claim 1, which comprises means providing a large lever arm when said hydraulic cylinders move the third lateral section.

7. A machine according to claim 6, which comprise first plates having a plurality of orifices in the shape of a Y connected to the third lateral section, wherein said hydraulic cylinders comprise first journals which are guided in said orifices provided in said plates.

8. A machine according to claim 7, wherein one of the branches of each of the orifices is substantially parallel to the pipe of the third lateral section and wherein the two other branches of the orifices are divergent and are directed toward a center portion of the machine in a working position.

9. A machine according to claim 7, wherein said plates comprise a mobile guide for blocking opening of at least one of the branches and for automatically guiding a journal of the cylinders toward a branch which is directed upward.

10. A machine according to claim 9, wherein said mobile guide is rotatably connected to a pivot member and is rotatable under the effect the weight of the mobile guide.

11. A machine according to claim 9, wherein said first-plates comprise first and second stops for stopping the mobile guides.

12. A machine according to claim 6, wherein the hydraulic cylinders comprise journals housed in orifices of an elongated shape which are provided in plates integral with the third lateral section and wherein the journals are guided by a plurality of guiding devices which are integral with the second lateral section.

13. A machine according to claim 12, wherein, in a working position, the orifices are oriented obliquely upward in the direction of a center portion of the machine.

14. A machine according to claim 12, wherein each of the guiding devices comprise a pair of plates which hold the journals in a position located above a horizontal plane passing through the pins when the third lateral section is folded.

15. A machine according to claim 14, wherein the plates which are integral with the third lateral section straddle the plates of the guiding devices when said sections are folded.

16. A machine according to claim 6, wherein each hydraulic cylinder comprises a disk which is housed between two guides provided on plates which are connected to the third lateral section, and wherein said disk comprises an eccentric journal which is housed in orifices formed in the said plates.

17. A machine according to claim 16, wherein the orifices formed in the plates form two branches arranged in the shape of a T, an upper branch thereof being approximately parallel to the pipe of the third lateral section and an additional branch being approximately perpendicular to the pipe of the third lateral section.

18. A machine according to claim 16, wherein in a working position, the two guides are located above and below the disk of each hydraulic cylinder and the two guides cooperate with the disk of each hydraulic cylinder to hold the third lateral section during movement of the third lateral section around the pin.

19. A machine according to any of claim 17, wherein, in a working position, the eccentric journal is located in an upper branch of the orifices formed in the plate and wherein, in a transporting position, the eccentric journal is located in an opposite end of the additional branch.

20. A machine according to claim 6, wherein a rod portion of each hydraulic cylinder comprises a first journal which is engaged in an orifice in the shape of a T with a first plate integral with the third lateral section and a lug having a second journal housed in an oblong orifice with a second plate, which is also integral with the third lateral section.

21. A machine according to claim 20, wherein said lug is substantially perpendicular to a rod of the hydraulic cylinder.

22. A machine according to claim 20, wherein the first and second plates are substantially parallel to one another.

23. A machine according to claim 20, wherein the first and second journals are eccentric and wherein one extends forward and the other rearward as viewed in the direction of advance of the machine.

24. A machine according to claim 20, wherein the T-shaped guiding orifice comprises a first branch substantially perpendicular to the pipe of the third lateral section and a second branch which is substantially parallel to said pipe and which is more distant from this pipe than the first branch.

25. A machine according to claim 24, wherein, in a working position, the first journal is located in the second branch of the T-shaped orifices, and in a transporting position, the first journal is located in an opposite end of the first branch.

26. A machine according to claim 24, wherein the oblong orifice of the second plate is approximately parallel to the second branch of the T-shaped orifice and to the pipe of the third lateral section and is located approximately middistance between two ends of the first branch of the T-shaped orifice.

27. A machine according to claim 26, wherein relative to a plane of symmetry S of the T-shaped orifice, each oblong orifice extends, on one side, in the direction of an outside rotor, as far as the second branch of the T-shaped orifice, and, on the other side, in the direction of rotor of second lateral section, over a distance equal to half the length of the first branch of the orifice.

28. A machine according to claim 1, which comprises tie rods extending between the pins between first and second lateral sections and a crossbeam integral with beam.

29. A machine according to claim 28, wherein the tie rods are connected to a crossbeam by pivot members which extend in the extension of the pins between the central section and the first lateral section.

30. A machine according to claim 28, wherein the tie rods comprise flexible elements.

31. A machine according to claim 1 wherein the housings of the central, first and second sections comprise stops for limiting pivoting angles of at least one of the lateral sections around the pins during transposition in the transporting position.

32. A machine according to claim 1, which comprises joining pieces connected to the housings wherein the housings and joining pieces comprise stops which are directed toward the ground.

33. A machine according to claim 1, wherein each hydraulic cylinder comprises a locking device which is maneuverable from a distance and includes a plate for locking a corresponding journal when the machine is in the transporting position.

34. A machine according to claim 1, which comprises two telescopic stopping devices connecting the second lateral sections to the central section.

35. A machine according to claim 34, wherein each telescopic stopping device comprises a locking device, which is maneuverable from a distance, for locking the stopping device into the transporting position and for immobilizing the second lateral section in this position.

36. A machine according to claim 1, which comprises a protective device for protecting working members of the machine when being transported by the sections.

37. A machine according to claim 36, wherein the protective device comprises a central part attached to central section of frame, two intermediate parts attached to the second lateral sections, and two outside parts which are attached to the third lateral sections.

* * * * *